(12) United States Patent
Koshino et al.

(10) Patent No.: US 7,254,316 B2
(45) Date of Patent: Aug. 7, 2007

(54) DATA RECORDING METHOD AND DATA RECORDING DEVICE USING SAME

(75) Inventors: Toshiharu Koshino, Moriguchi (JP); Toshiki Yamamura, Suita (JP); Yuji Nagaishi, Daito (JP); Tsukasa Yoshiura, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1198 days.

(21) Appl. No.: 09/780,534

(22) Filed: Feb. 9, 2001

(65) Prior Publication Data

US 2001/0026679 A1   Oct. 4, 2001

(30) Foreign Application Priority Data

Feb. 10, 2000   (JP)   ............... 2000-034074

(51) Int. Cl.
    *H04N 5/91*   (2006.01)
(52) U.S. Cl. ......................... 386/96; 386/125
(58) Field of Classification Search ............ 386/46, 386/96, 95, 98, 104, 125, 126, 52
    See application file for complete search history.

(56) References Cited

U.S. PATENT DOCUMENTS

| | | | |
|---|---|---|---|
| 5,506,825 A * | 4/1996 | Gushima et al. | 386/96 |
| 5,684,784 A * | 11/1997 | Iwasaki et al. | 369/124.08 |
| 5,809,201 A * | 9/1998 | Nagasawa | 386/68 |
| 5,940,351 A * | 8/1999 | Fujinami et al. | 369/30.04 |
| 5,991,502 A * | 11/1999 | Kawakami et al. | 386/109 |
| 6,148,136 A | 11/2000 | Tanaka et al. | |
| 6,205,104 B1 * | 3/2001 | Nagashima et al. | 369/59.14 |
| 6,684,026 B2 | 1/2004 | Kanota et al. | |
| 6,898,369 B2 * | 5/2005 | Tanaka et al. | 386/95 |

FOREIGN PATENT DOCUMENTS

| | | |
|---|---|---|
| EP | 0 643 388 A1 | 3/1995 |
| EP | 0 777 229 A2 | 6/1997 |
| EP | 0 777 392 A2 | 6/1997 |
| EP | 0 797 196 A2 | 9/1997 |
| EP | 0 913 822 A2 | 5/1999 |
| EP | 1 067 770 A1 | 1/2001 |
| JP | 5 314 492 A | 11/1993 |
| JP | 07-130088 A | 5/1995 |
| JP | 09-247621 A | 9/1997 |
| JP | 10-106234 A | 4/1998 |
| JP | 10 125007 A | 5/1998 |
| JP | 11-144392 * | 5/1999 |
| JP | 11-149719 A | 6/1999 |
| WO | WO 97/47132 A1 | 12/1997 |

* cited by examiner

*Primary Examiner*—Huy T. Nguyen
(74) *Attorney, Agent, or Firm*—Akin Gump Strauss Hauer + Feld LLP

(57) ABSTRACT

A data recording device, using a disc, wherein it is easy to handle respective audio signals independently and which receives digital data got by multiplexing plural audio signals is provided.

In a data recording device according to the present invention data blocks are identified in the frame unit from among received digital data and, at least, the first audio block and the second audio block are generated from among the data blocks so that each audio block is recorded from the leading address of the recording segment formed on the disc.

8 Claims, 26 Drawing Sheets

F I G. 6
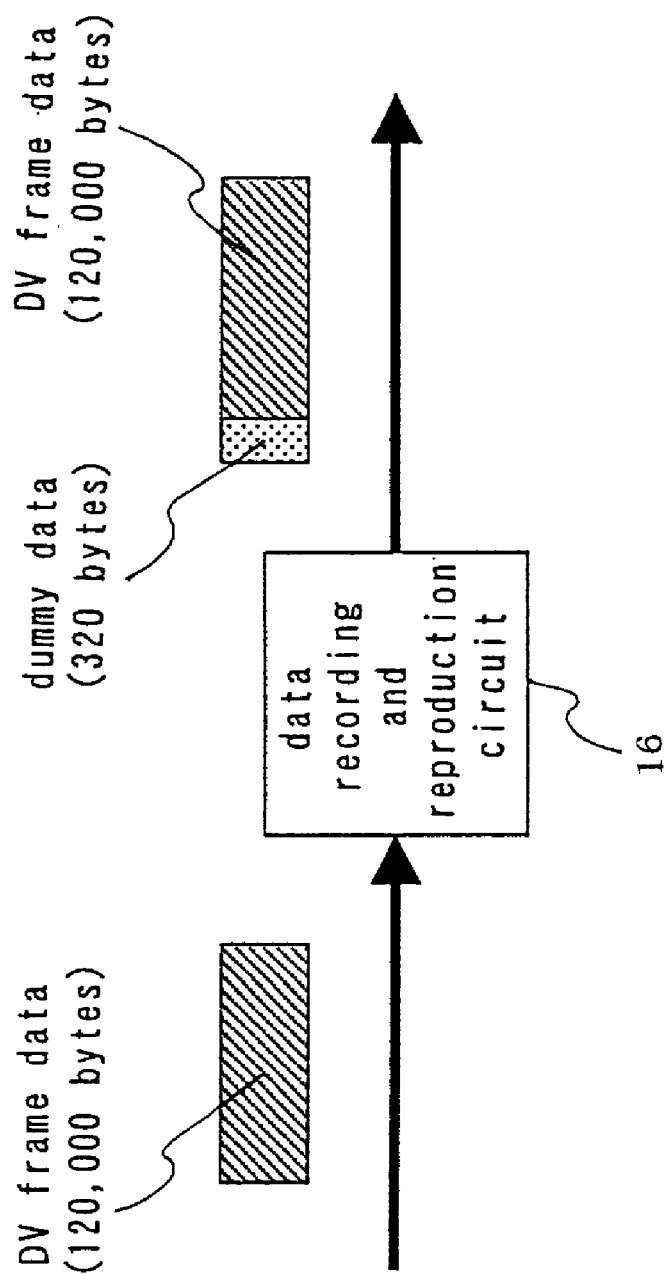

F I G. 20
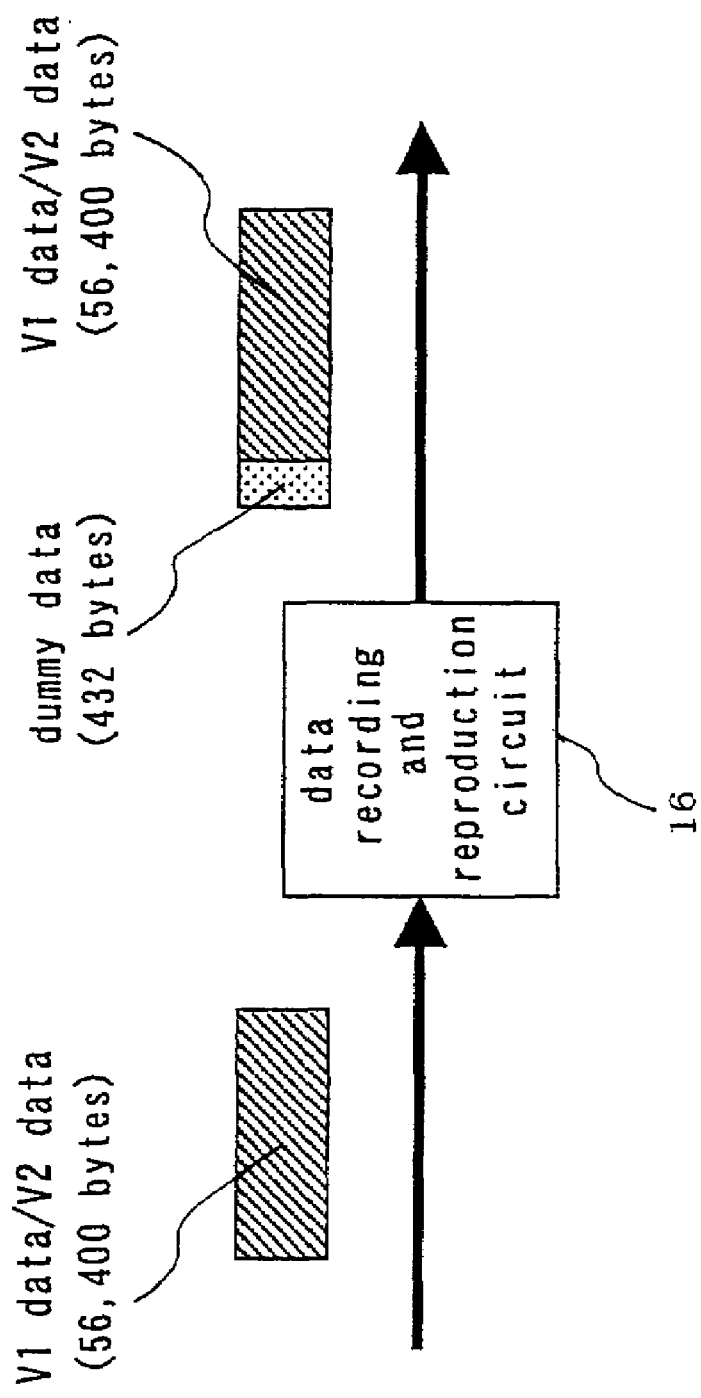

DATA RECORDING METHOD AND DATA RECORDING DEVICE USING SAME

BACKGROUND OF THE INVENTION

This invention relates to a data recording device and a data recording method for recording the video and audio data.

In recent years, discs for a magnetic disc device, optical disc device or the like have been rapidly improved in functions such as recording capacity and transfer speed. In particular, the improvement of the functions of hard disc devices used in many cases for recording and reproduction of the video and audio data has been remarkable.

On the other hand, the development of digital interfaces has progressed and digital VCR (hereinafter referred to as DV) apparatuses have started to be standardized with a digital interface of the IEEE1394 standard mounted thereon. In the IEEE1394 standard, the ISOCHRONOUS transfer system is stipulated which transfers the digital video and audio data in sequence. In a transfer system using the IEEE1394 interface, for example, a transfer system for the video and audio data of the DV format (hereinafter referred to as "DV data") is stipulated with IEC61883.

During the progress of such technology and products a disc device having the IEEE1394 interface has been proposed. For example, a disc device described in the Japanese Patent Application H11(1999)-364633 is connected to a PC or a DV apparatus with the IEEE1394 interface and it is possible to record DV data which have been received via the IEEE1394 interface in a disc.

<Description of FIG. 25>

In the DV format, a format for transferring the DV data on the IEEE1394 bus is also stipulated. As shown in FIG. 25, in the case of DV data converted from an NTSC signal, one frame (hereinafter referred to as DV frame) is formed of 10 DIF sequences (12,000 bytes).

In each of the DIF sequences, data are arranged in the order of a header, a sub-code, a video auxiliary data (VAUX), audio data and video data. Each storage region is further divided into DIF blocks of 80 bytes which comprises an ID part of 3 bytes showing the contents of data and so on, and a data part of 77 bytes.

<Description of FIG. 26>

Data arrangement of each of the DIF sequences is shown in FIG. 26. Each of the DIF sequences is transmitted in a configuration where audio data of 1 DIF block and video data of 15 DIF blocks are alternately arranged following the header of 1 DIF block (H0), sub-codes of 2 DIF blocks (SC0, SC1) and video auxiliary data of 3 DIF blocks (VA0, VA1, VA2). In the case of DV data converted from a PAL signal, the data are formed of 12 DIF sequences.

Furthermore, in the Japanese Patent Application H10 (1998)-229324, it is devised that the DV data of the above-described configuration is added with the dummy data, is made into blocks which agree with an integer times of the recording segments (sector: 512 bytes) of the hard disc and is recorded from the head of the sector so that the reproduction can be carried out from the disc in the frame unit.

However, in the case that the recording is carried out on the disc in the format transmitted over the IEEE1394 bus without change, the audio data are recorded by being scattered at the unit of 80 bytes. Therefore, in the case that the video data or the audio data are edited independently (video editing and audio editing), the problem arises that the reading out and writing in processes from the disc become complicated. The above-described editing is a process of replacing the video data or the audio data once recorded on the disc with another video data or another audio data and it is necessary to independently overwrite the recording regions for the video data or the audio data on the disc. The editing of the video data is generally referred to as "video insert" and the editing of the audio data is generally referred to as "post-recording" or "audio insert."

A conventional data recording device using a disc device which records and reproduces the DV format signal is cited as an example and is described.

The conventional data recording device records the inputted DV format signal in the disc device in the order as it is. Accordingly, an audio signal is distributed and arranged in blocks of 80 bytes on the disc device.

On the other hand, the disc or the like generally carries out recording at the unit of a constant recording segment as the minimum unit. In the above-described example, the recording segment (sector) of the minimum unit is 512 bytes.

In the case that an audio signal on the disc device is only replaced with another audio signal, one or two recording sectors (512 bytes each) including that audio signal (80 bytes) is once read out in a buffer memory together with a video signal and so on included therein. The DV format signal read out into the buffer memory is separated (demultiplexed) into the video signal and the audio signal. The separated audio signal is further separated into the audio signals of respective channels. Only the audio signals on which post-recording is intended to be carried out are replaced with another audio signals. After that, the separated audio signals of respective channels including the audio signals of the replaced channel and the video signal are multiplexed so as to be converted into the DV format signal, and that DV format signal is recorded in the original one or two recording sectors.

Accordingly, though the data device is only doing the operation of recording from the user's point of view, the separation and the multiplexing of the signals are carried out in reality and the disc device carries out recording and reproduction. Furthermore, as described above, an amount of data which is far bigger than the amount of data essentially to be recorded is recorded and reproduced. Accordingly, the data processing speed of the data recording device becomes very slow and it becomes difficult to carry out the post-recording or the like of the video and audio signals with high data rates.

Here, the post-recording is, in general, a function of replacing and recording the audio signals of a particular channel during the period of time while video signals and audio signals are being normally reproduced.

Accordingly, it is desirable to shift naturally from a normal reproduction of the video signals and the audio signals to the post-recording operation.

This data recording device is connected to a DV apparatus which can accept the DV data via the IEEE1394 interface and furthermore the DV apparatus converts the received data into an NTSC signal so as to be outputted. The outputted NTSC signal is inputted into a TV set so that the video can be watched and the audio can be listened by the TV set. The scene where the post-recording is carried out is illustrated while the user is watching the screen of the TV set and listening to the audio from the TV speaker(s).

During the normal reproduction, the data recording device outputs a DV format signal which has been reproduced from the disc device into the IEEE1394 interface without change. The DV apparatus which receives this signal separates the DV format signal so as to be demultiplexed into the original video signals and the original audio signals of respective channels. The TV set displays the video signals on the display screen and outputs the audio signals through the speaker(s).

The user starts the post-recording by pressing the post-recording button. During the post-recording a new DV format signal, by which an audio signal of a certain channel is replaced, is recorded in the disc device and, at the same time, this new DV format signal is outputted. The generating method of this new DV format signal is, as mentioned above, carried out by separating the DV format signal read out from the disc device, multiplexing it and so on. In many cases some parts or all of the processing of these separation, multiplexing and so on are carried out by the software. In such cases the problem arises that the output of this new DV format signal is delayed because much time is needed for separation, multiplexing and so on.

In particular, the output delay of the first signal which is processed by separation and so on after the conditions is over where signals reproduced from the disc device are outputted without change, that is to say, the output delay of the first frame after the post-recording is started, tends to be a problem. In the case that the delay amount of the output of the first frame after the post-recording is started exceeds the tolerance, so that it cannot follow the ISOCHRONOUS transfer of the IEEE1394 interface (refers to the occurrence of the ISOCHRONOUS transfer period which cannot transfer a signal) there is a possibility that the problem occurs that the video and the audio of the TV set are momentarily interrupted at the time when the post-recording is started.

The ISOCHRONOUS transfer is for preventing the transfer delay amount of the sequential signals such as the video signals or the audio signals from exceeding the tolerance and, therefore, the delay amount of the data transfer by the ISOCHRONOUS transfer usually falls within a constant range. Accordingly, the apparatuses which have the IEEE1394 interface generally have only the buffer memories which are necessary by assuming the delay amount of the tolerance stipulated by the standard of the ISOCHRONOUS transfer. In the case that a large delay occurs which exceeds the delay amount of this tolerance at the starting time of the post-recording, there is a risk that the video and the audio of the TV set will be interrupted for a moment at the starting time of the post-recording.

At the time when post-recording is ended, the opposite phenomenon to this occurs. When the user presses the end button of post-recording, the above data recording device outputs a reproduction signal of the DV format from the disc device as it is in its original manner. However, at the ending time of the post-recording the data recording device still holds a signal (a signal just before the end of the post-recording period) which is undergoing the process, such as separation, and it is essentially, necessary to output this signal.

But the delay due to the process, such as separation, during the post-recording cannot be maintained as it is during the normal reproduction. For example, in the case that the operations of the normal reproduction, the post-recording, the normal reproduction and the post-recording are repeated many times, the delay is added every time so that there is the risk that the buffer memory sooner or later overflows. Therefore, at the time when the post-recording is ended, the delay is resolved in some cases by skipping the output of the delayed signals (signals which have not yet been outputted just before the end of the post-recording period). In this case, video skipping and audio skipping occur due to the skipped signals.

In order to solve this problem a data recording device is proposed which has the configuration wherein the video blocks and the audio blocks are generated at each frame so as to agree with the integer times of the recording segment (sector: 512 bytes) of the hard disc by blocking the video data and the audio data separately, and the video blocks and the audio blocks are recorded in the different regions on the hard disc.

According to the DV standard for the consumer use, it is possible to record plural stereo audio signals and there is a request to implement the above-described audio edit of each stereo audio signal which has once been recorded. In the case of the NTSC signal, the first stereo audio signal is stored in the former half part which is the DIF sequence 0 to 4 while the second stereo audio signal is stored in the latter half part which is the DIF sequence 5 to 9 in a general DV apparatus. In the case of the PAL signal, the first stereo audio signal (or the audio signals of the first and the second channels) is stored in the DIF sequence 0 to 5 and the second stereo audio signal (or the audio signals of the third and the fourth channels) is stored in the DIF sequence 6 to 11.

In the above-described conventional data recording device, however, the process of reading out or recording each of the stereo audio signal independently from or to the disc is difficult and, therefore, the problem occurs that the device is not appropriate for the operation of independent audio editing of each stereo audio signal because all of the audio data are blocked in the frame unit so as to agree with the integer times of the recording segment (sector: 512 bytes) of the hard disc.

On the other hand, in the case that the received digital data are recorded on the disc or the like as they are, it is difficult to replace (carry out post-recording), for example, the audio signal of the first channel alone from among the digital data with another audio signal.

Considering the above-described conventional problems, the present invention has the purpose of providing a data recording device which makes it possible to edit the video data and the audio data easily and independently from among the digital data recorded in the disc device.

SUMMARY OF THE INVENTION

In order to achieve the above-described purpose a data recording device according to the present invention comprises a block generation part for identifying data blocks in the frame unit from among the received digital data so as to separate plural audio signals (or video signals) individually from among the data blocks, and a data recording and reproduction control part for controlling each audio block (or video block) to be recorded from the leading address of the recording segment formed on the disc.

The data recording device which is configured as described above can edit each audio block (replace with another audio data) easily and independently which has been recorded in the disc device.

The invention according to Claim 1 of the present invention is a data recording device characterized by comprising:
an interface part for receiving digital data;
a disc which can record said digital data;
a block generation part for identifying data blocks in the frame unit from among said received digital data and for generating, at least, the first audio block and the second audio block from among said data blocks; and
a data recording and reproduction control part for controlling said first audio block and said second audio block to be recorded respectively from the leading address of the recording segment formed on said disc.

A data recording device according to the present invention separates plural received audio signals (audio data) so as to be recorded respectively from the leading address of the recording segment formed on the disc for each audio signal. Therefore, the device has the effect that a particular audio signal can be outputted alone and a particular audio signal can be replaced alone because it becomes easy to access, reproduce or record a particular audio signal alone on the disc at the time of reproduction, post-recording or the like.

According to the present invention, each of the plural programs included in the received digital data is recorded respectively from the leading address of the recording segment on the disc or the like. For example, according to the present invention, a signal is received wherein the classical music and the jazz music are multiplexed, the classical music and the jazz music are separated and recorded respectively from the leading address of the recording segment on the disc or the like so that a particular audio signal on the disc can be easily accessed alone, and the effect is got that, for example, the classical music can be easily reproduced and outputted alone or another audio signal can be easily recorded by replacing only the jazz music with it.

There are some cases where the format of the outputted audio signal (or a compound signal of a video signal, an audio signal and the like) is different from the format of the inputted (received) signal.

For example, in a conventional data recording device where the classical music and the jazz music are recorded while being multiplexed, that signal recorded while being multiplexed is reproduced and that signal is separated into the classical music and the jazz music and, furthermore, the classical music has to be outputted alone when the classical music is intended to be outputted alone.

In this manner a conventional data recording device has the problem that separation and multiplexing has to be repeated every time of the reproduction in accordance with the required information.

There are some cases where only the classical music becomes unnecessary to be replaced with another audio signal and the jazz music is desired to remain among the recorded classical music and jazz music.

The present invention has the effect that the classical music can be easily replaced alone with recording the classical music and the jazz music respectively from the leading address of the recording segment.

In a conventional device, the recorded signal wherein the classical music and the jazz music are multiplexed, has to be reproduced and that signal has to be separated into the classical music and the jazz music, the classical music has to be, furthermore, replaced with another audio signal and the replaced signal has to be multiplexed with the jazz music again to be recorded on the disc or the like.

In a data recording device according to the present invention, reproduction is unnecessary in such a case and it is sufficient to record another audio signal alone.

On the other hand, in a conventional data recording device it is necessary to reproduce the data amount which is the sum of the classical music and the jazz music, and to record the data amount which is the sum of another audio signal and the jazz music.

Furthermore, there are some cases where the classical music is reproduced to be listened to and, at the same time, the jazz music is replaced with another audio signal.

In a data recording device according to the present invention, the address of the classical music and the address of the jazz music can be accessed respectively and, therefore, the address of the classical music is accessed in the reproduction processing and the address of the jazz music is accessed in the recording processing and, thereby, a very effective reproduction and recording can be carried out.

In such a case, in a conventional device wherein the classical music and the jazz music are recorded while being multiplexed, it is necessary that the signal wherein the classical music and the jazz music are multiplexed, is reproduced, the reproduced signal is separated into the classical music and the jazz music, the classical music is outputted and the jazz music is replaced with another audio signal, and another audio signal and the classical music are multiplexed and recorded.

There is a case wherein the data amount reproduced from the disc by a conventional data recording device (the classical music and the jazz music) or the data amount recorded on the disc (another audio signal and the classical music) become double in comparison with the data amount in the case where the classical music is accessed alone at the time of reproduction and another audio signal is recorded alone by accessing the address where the jazz music is recorded as in the present invention.

And in the present invention the signal amount to be processed can be reduced at the time of reproduction or at the time of post-recording because the digital data are separated into plural audio data only at the time of recording and the effect is got that data processing by the software becomes possible by using a compact and inexpensive microprocessor.

And the effect is got that a data recording device which uses a disc of a slow access speed can be realized because the data amount which is reproduced from and recorded onto the disc can be reduced in the case that an audio signal of a particular program is recorded alone by the replacement.

The present invention has the effect that a data recording device which uses a disc device or the like as the recording medium is realized wherein the audio data of a particular channel can be easily recorded selectively by replacement (post-recording or the like) from among the audio data of plural channels which are included and dispersed in the received digital data and have a short data length. This data recording device has the effect that neither interruption nor skips of the video or the audio on the TV occur.

In the description of the specification and the claims of the present invention, the word "disc" includes a magnetic disc, an optical disc, an optical magnetic disc and includes both replaceable discs such as a DVD media and non-replaceable discs such as a hard disc device.

In the description of the specification and the claims of the present invention, the word "one frame" means a piece of image data of a video signal in the case that the digital data includes a video signal and an audio signal. "One frame" includes both concepts of one field and one frame. In the case that the digital data consist of only the audio signals, "one frame" means one transmission packet of an audio signal.

"One audio signal" is a concept including, for example, one pair of stereo signals (left channel signal and right channel signal) an audio signal of multi-channels attached to a single video signal (for example, a simultaneous broadcast of multiple languages) and one monaural audio signal. And, an audio signal includes an audio signal which is combined with a video signal (for example, a TV program) and an audio signal which consists of only an audio signal (for example, a music delivery through the Internet).

The invention according to Claim 2 of the present invention is a data recording device characterized by comprising:
an interface part for receiving digital data;
a disc which can record said digital data;
a block generation part for identifying data blocks in the frame unit from among said received-digital data and for generating, at least, the first video block and the second video block from among said data blocks; and
a data recording and reproduction control part for controlling said first video block and said second video block to be recorded respectively from the leading address of the recording segment formed on said disc.

A data recording device according to the present invention separates the plural video data included in the received digital data into each video data and records each video data from the leading address of the recording segment on the disc and the like.

As for the case where plural video data are included in one received digital data stream, for example, there is the case where a signal of multi-channel broadcast is transmitted which is formed by multiplexing the video signal of a music program and the video signal of a sports program.

The present invention has the effect that a signal is received wherein a video signal of a music program and a video signal of a sports program are multiplexed, the video signal of the music program and the video signal of the sports program are separated and are recorded respectively from the leading address of the recording segment on the disc and the like, and thereby, for example, a video signal of a music program can be easily outputted alone and a video signal of a sports program can be easily replaced alone with another video signal.

At present, the DV format provides a data format wherein each video frame includes only a single video signal. Accordingly, for example, as for a signal of such a DV format, the present invention according to Claim 1 and so on can be realized by separating two pairs of stereo audio signals (or four monaural audio signals) into two or four blocks.

For example, it can be considered that a new version of DV format wherein each video frame includes plural video signals will be stipulated in future. By doubling the data compression ratio of each video signal (a half amount of the data) two video signals can be stored in each video frame. In the same manner, by tripling the data compression ratio of each video signal (⅓ amount of the data) three video signals can be stored in each video frame. In such a case the present invention according to Claim 2 and so on can be realized by separating a video signal, or a video signal and an audio signal into plural blocks.

Embodiment 4 of the present invention is described by assuming the existence of a DV format wherein each video frame includes plural video signals in the above-described manner. The application object of the present invention, however, is not limited to a DV format.

According to the present invention it becomes easy for a data recording device which receives, separates and records a multiplexed video signal to access, reproduce or record a particular video signal on the disc alone at the time of reproduction or at the time of replacement of a particular program. Thereby, the device has the effect that a particular video signal can be replaced or outputted alone.

For example, in the above-described example, a video signal of a music program is outputted alone or a video signal of a sports program is outputted alone from among the recorded signals of the multi-channel broadcast.

There are some cases where the format of the outputted video signal (or a compound signal of a video signal, an audio signal or the like) is different from the format of the inputted (received) signal.

For example, in a conventional data recording device wherein a: video signal of a music program and a video signal of a sports program are recorded while being multiplexed, that signal recorded while being multiplexed has to be reproduced and this signal has to be separated into a video signal of a music program and a video signal of a sports program and, furthermore, a video signal of the music program and the audio signal of this music program have to be multiplexed to be outputted in order to output the video signal of the music program alone.

In this manner, the conventional data recording device has the problem that separation and multiplexing has to be repeated every time of the reproduction in accordance with the required information.

There are some cases where only the music program becomes unnecessary and is intended to be replaced alone with another program while the sports program is desired to remain among the recorded sports program and the recorded music program. In such cases the music program can be easily replaced alone with another program because the music program can be accessed alone.

The present invention has the effect that the music program can be easily replaced alone by recording the video signal of the sports program and the video signal of the music program respectively from the leading address of the recording segment.

In a conventional device, the recorded signal has to be reproduced wherein a video signal of a music program and a video signal of a sports program are multiplexed, this signal has to be separated into the video signal of the music program and the video signal of a sports program and, furthermore, the video signal of a music program (The audio signal is generally included.) has to be replaced with another video signal (The audio signal is generally included.), and the replaced signal has to be multiplexed again with the video signal of a sports program and has to be recorded onto the disc or the like.

For example, there are cases where only the music program becomes unnecessary and is intended to be replaced with another program among the sports program and the music program which are recorded while the sports program is desired to remain.

In the conventional device in which the video signal of the music program and the video signal of the sports program is multiplexed and recorded, the signal, wherein the video signal of the music program and the video signal of the sports program is multiplexed, has to be reproduced, this reproduced signal has to be separated into the video signal of the music program and the video signal of the sports program and, furthermore, the video signal of the music program (The audio signal is generally included.) has to be replaced with another video signal (The audio signal is generally included.), and the replaced signal has to be multiplexed again and has to be recorded onto the disc or the like.

In some cases, the data amount which has to be recorded onto the disc by the conventional data recording device (sports program and another program) becomes the double of the recorded data amount in the case where the video data of another program (The audio data is generally included.) is recorded alone as in the present invention.

Furthermore, there are cases where a sports program is reproduced to be viewed and a music program is replaced with another program at the same time.

The address of the sports program is accessed during the reproduction process and the address of the music program is accessed during the recording process because a data recording device according to the present invention can access the address of the music program and the address of the sports program respectively and, thereby, a very effective reproduction and recording can be carried out.

In such a case, in a conventional device wherein a video signal of a music program and a video signal of the sports program are recorded while being multiplexed, the signal is reproduced wherein the video signal of the music program and the video signal of the sports program are multiplexed, the reproduced signal is separated into the music program and the sports program, and the video signal and the audio signal of the sports program are multiplexed and outputted while the music program is replaced with another signal, and another signal and the sports program are multiplexed and recorded.

In some cases, the data amount which has to be reproduced or recorded onto the disc by the conventional data recording device (sports program and another program) becomes double in comparison with the reproduced or recorded data amount in the case where the sports program is accessed and reproduced alone at the time of reproduction and the video data of another program (The audio data is generally included.) is recorded alone by accessing the address where the music program is recorded at the time of recording as in the present invention.

And the processed signal amount at the time of reproduction or in the case of replacing a particular video signal alone can be reduced in the present invention because the digital data are separated into the plural video data only at the time of recording. Therefore, the effect is got that the software data processing by using a compact and inexpensive microprocessor becomes possible.

And the effect is got that a data recording device can be realized which uses a disc of slow access speed because the data amount reproduced from and recorded onto the disc can be reduced.

"Video signal" includes the case where, for example, a video signal is combined with an audio signal (for example, a TV program) and the case of a signal consisting of a video signal only (for example, many Internet TV broadcasts).

The invention according to Claim 3 of the present invention is a data recording device according to Claims 1 or 2 characterized in that said block generation part determines the data of said data block which forms, at least, one block among said first audio block, said second audio block, said first video block or said second video block in accordance with a signal format.

The present invention relates to a data recording device which receives and records the video and audio signals or the like of plural formats.

The video and audio signals of plural formats are, for example, broadcast signals of the ATV broadcast in the USA including the video signals of plural formats.

The present invention has the effect that a data recording device is realized, with which insert editing and assembly editing of the video signals or the audio signals such as the video and audio signals of an arbitrary format are easy.

The present invention judges the format of digital data, carries out memory allocation (division unit) on the disc in accordance with the format, separates plural video signals or plural audio signals from the digital data in accordance with the format, and records each video signal or each audio signal respectively from the leading address of the recording segment formed on the disc.

Thereby, a particular audio signal or a particular video signal can always be easily accessed because each video signal or each audio signal can be easily accessed in the audio signal and/or the video signal of any format and the effect is got that a data recording device is realized where the particular audio signal or video signal are easily reproduced, or replaced and recorded.

The difference in the format is a concept which includes the difference of the compression ratio in addition to the difference of the frame number, the scanning line number and the resolution, and the difference between the interlace signal and the progressive signal in the present specification.

In the same manner, with respect to the digital data got by multiplexing a plural and arbitrary number of audio signals or video signals, the present invention carries out memory allocation (division unit) on the disc in accordance with the digital data, separates plural video signals or plural audio signals from the digital data, and records each video signal or each audio signal respectively from the leading address of the recording segment formed on the disc.

The digital data got by multiplexing a plural and arbitrary number of audio signals or video signals are, for example, the DV data including one video signal or the DV data including two video signals.

Thereby, in the digital data got by multiplexing a plural and arbitrary number of audio signals or video signals, a particular audio signal or a particular video signal can always be easily accessed because each video signal or each audio signal can be easily accessed respectively, and the effect is got that a data recording device can be realized wherein the audio signals or the video signals are easily reproduced, or replaced and recorded.

The invention according to Claim 4 of the present invention is a data recording device characterized by comprising:

an interface part for receiving digital data;

a disc which can record said digital data;

a block generation part which identifies data blocks in the frame unit from among said received digital data, generates, at least, a first audio block and a second audio block from among said data blocks and generates a first multi-audio block comprising plural said first audio blocks and a second multi-audio block comprising plural said second audio blocks; and a data recording and reproduction control part for controlling said first multi-audio blocks and said second multi-audio blocks to be recorded respectively from the leading address of the recording segment formed on the disc.

The present invention has the same effect as in the description about the invention according to Claim 1. More concretely, it is as follows.

A data recording device according to the present invention separates plural audio signals and records each of the audio signals from the leading address of the recording segment formed on the disc. Thereby, the effect is got that a particular audio signal can be outputted alone and a particular audio signal can be replaced alone because it becomes easy to access, reproduce or record a particular audio signal alone on the disc at the time of reproduction or at the time of recording by replacement.

And in the case that the data recording device of the present invention replaces a signal, it separates digital data into plural audio data only at the time of recording. And, therefore, a wasteful reproduction of the signal is unnecessary, the data amount to be recorded is small and the signal amount to be processed is small. And, therefore, the effect is got that the software data processing by using a compact and inexpensive microprocessor becomes possible.

And the data amount reproduced from and recorded onto the disc can be reduced and, therefore, the effect is got that a data recording device which uses a disc of a slow access speed can be realized.

The present invention has the effect that a data recording device is realized which has a disc device or the like as a recording medium wherein it is easy to selectively replace and record (post-recording or the like) the audio data of a particular channel from among the audio data of plural channels which are included in the received digital data and are of short data length and are dispersed. This data recording device has the effect that no interruption or skipping of the video or the audio occurs on the TV screen.

The present invention generates a multi-audio block by combining plural audio blocks in the buffer memory in addition to the above-described effect.

Thereby, the effect is got that a signal can be recorded with a few times of access to the disc.

In the disc such as a hard disc device, not only the time required for recording and reproduction but also the time required for the head to access the places to be recorded or to be reproduced is long. The data processing ability of the data recording device as the whole can be enhanced by storing a certain number of audio blocks in the buffer memory (multi-audio block) and by recording the multi-audio block in a lump on the disc with one access of the head instead of recording individual audio blocks on the disc at each frame.

And the recording segment which is the minimum unit of recording in the hard disc device is, for example, 512 bytes and in the case that the data amount which is intended to be recorded is not the integer times of 512 bytes, dummy data are added so that the data amount becomes the integer times of 512 bytes. The dummy data are necessary but are desired to be as small as possible.

The present invention generates data of the integer times of 512 bytes by adding dummy data to the multi-audio block and records data on the disc instead of generating data of the integer times of 512 bytes by adding dummy data to individual audio blocks and recording data on the disc. Thereby, it has the effect that the total amount of the dummy data can be made small.

The invention according to Claim 5 of the present invention is a data recording device according to Claim 4 characterized in that said first multi-audio block and said second multi-audio block are formed of audio blocks for 16 frames respectively.

The present invention has the same effect as the invention according to Claim 4 and, furthermore, has the effect that a signal can be recorded with one access to the disc at every 16 frames.

And in the present invention, the time corresponding to the frame amount of the multi-audio block becomes the minimum recording time because recording to the disc is not carried out until the multi-audio block is generated. The present invention has the effect that the total amount of dummy data can be made as small as possible and the minimum recording time can be achieved to be a degree that there is no problem in the practical use.

The invention according to Claim 6 of the present invention is a data recording device according to Claims 1 or 4 characterized in that said disc device is a hard disc drive.

The present invention realizes a data recording device of a hard disc drive which has the same effect as in the description about the invention according to Claims 1, 2 or 4. More concretely, it is as follows.

The data recording device of a hard disc drive according to the present invention separates plural received audio signals (or video signals) and records each audio signal (or video signal) from the leading address of the recording segment formed on the disc. Therefore, it becomes easy to access, reproduce or record a particular audio signal (or video signal) alone on the disc at the time of reproduction or at the time of recording by replacement. And, therefore, the effect is got that a particular audio signal (or a particular video signal) alone can be outputted or a particular audio signal (or a particular video'signal) alone can be replaced.

And in the case that the data recording device of a hard disc drive according to the present invention replaces a signal, digital data are separated into plural audio data (or a video signal) only at the time of recording. And, therefore, a wasteful reproduction of the signal is unnecessary, the data amount to be recorded is small and the signal amount to be processed is small. Therefore, the effect is got that the software data processing by using a compact and inexpensive microprocessor becomes possible.

And the data amount which is reproduced from the disc and which is recorded on the disc can be reduced and, therefore, the effect is got that a data recording device of a hard disc drive using a disc of a slow access speed can be realized.

The present invention has the effect that a data recording device is realized which has a hard disc drive as a recording medium wherein it is easy to selectively replace and record the audio data of a particular channel from among the audio data of plural channels which are included in the received digital data and are of short data length and are dispersed. The data recording device of this hard disc drive has the effect that no interruption or skipping of the video or the audio occurs on the TV screen.

The present invention has the effect that a signal can be recorded with a few times of access to a hard disc drive.

As for a hard disc drive, not only the time required for recording and reproduction but also the time required for the head to access the locations to be recorded or to be reproduced is long. The data processing ability of the data recording device of a hard disc drive as the whole can be enhanced by storing a certain number of audio blocks in a buffer memory (multi-audio block) and by recording the multi-audio block in a lump on the disc with one access of the head instead of recording individual audio blocks on the disc at each frame.

And the present invention generates data of the integer times of 512 bytes by adding dummy data to the multi-audio block and records the data on the hard disc drive. Thereby, the effect is got that the total amount of dummy data can be reduced.

The invention according to Claim 7 of the present invention is a data recording device according to Claims 1 or 4 characterized in that said digital data is digital data of a DV format, which includes the audio signals of plural channels and said first audio block and said second audio block comprise a pair of stereo audio signals respectively.

In addition to the effect described about the invention according to the above-described Claims 1 or 4, the present invention has the effect particularly in a data recording device which records digital data of a DV format, that the access to the respective stereo audio signals of the two pairs of stereo audio signals included in the DV format becomes easy and a data recording device is realized wherein it is easy to reproduce a particular stereo audio signal alone or to replace a particular stereo audio signal alone.

The invention according to Claim 8 of the present invention is a data recording method characterized by comprising:

the step of receiving digital data;

the step of identifying data blocks in the frame unit from among said received digital data and of generating, at least, a first audio block and a second audio block from among said data blocks; and the step of recording said first audio block and said second audio block respectively from the leading address of a recording segment formed on the disc.

According to the data recording method of the present invention, plural audio signals are separated from among the received digital data and each audio signal is recorded respectively from the leading address of the recording segment formed on the disc. Thus, it becomes easy to access, reproduce or record a particular audio signal alone on the disc at the time of reproduction or at the time of recording by replacement. And, therefore, the effect is got that a particular audio signal alone can be easily outputted or a particular audio signal alone can be easily replaced.

And according to the data recording method of the present invention, in the case that a signal on the disc is replaced, digital data is separated into plural audio data only at the time of recording. Therefore, a wasteful reproduction of the signal is unnecessary, the data amount to be recorded is small and the signal amount to be processed is small. Therefore, the effect is got that the software data processing by using a compact and inexpensive microprocessor becomes possible.

And the effect is got that data recording by using a disc of a slow access speed is realized because the data amount which is reproduced from the disc and which is recorded on the disc can be reduced.

The present invention has the effect that a data recording method, in which a disc is used as a recording medium, is realized wherein it is easy to selectively replace and record the audio data of a particular channel (post-recording or the like) by gathering the audio data of a particular channel together from among the audio data of plural channels which are included in the received digital data and are of short data length and are dispersed, and by recording. This data recording method has the effect that no interruption or skipping of the video or the audio occurs on the TV screen.

The invention is a data recording method characterized by comprising:

the step of receiving digital data;

the step of identifying data blocks in the frame unit from among said received digital data and of generating, at least, a first video block and a second video block from among said data blocks; and the step of recording said first video block and said second video block respectively from the leading address of a recording segment formed on the disc.

According to the data recording method of the present invention, plural video signals are separated from among the received digital data and each video signal is recorded respectively from the leading address of the recording segment formed on the disc. Thus, it becomes easy to access a particular video signal alone on the disc, to reproduce this video signal and to record this video signal therein at the time of reproduction or at the time of recording by replacement. And therefore, the effect is got that a particular video signal can be easily outputted alone or a particular video signal can be easily replaced alone.

Furthermore, according to the data recording method of the present invention digital data is separated into plural video data only at the time of recording. Therefore, a wasteful reproduction of the signal is unnecessary, the data amount to be recorded is small and the signal amount to be processed is small. And therefore, the effect is got that the software data processing by using a compact and inexpensive microprocessor becomes possible.

And the effect is got that data recording by using a disc of a slow access speed is realized because the data amount which is reproduced from the disc and which is recorded on the disc can be reduced.

The present invention has the effect that a data recording method, in which a disc is used as a recording medium, is realized, wherein it is easy to selectively replace and record the video data of a particular channel (post-recording or the like) by gathering the video data of a particular channel together from among the audio data of plural channels which are included in the received digital data and are of short data length and are dispersed, and by recording. In the case that a data recording device in accordance with this data recording method carries out, for example, an ISOCHRONOUS transmission of the video data, the effect is got that no interruption or skipping of the video or the audio occurs on the TV screen.

The invention is a data recording method characterized by comprising:

the step of receiving digital data;

the step of identifying data blocks in the frame unit from among said received digital data, of generating, at least, a first audio block and a second audio block from among said data blocks and of generating a first multi-audio block comprising plural said first audio blocks and a second multi-audio block comprising plural said second audio blocks; and the step of recording said first multi-audio block and said second multi-audio block respectively from the leading address of a recording segment formed on said disc.

The present invention has the same effect as in the description about the invention according to Claim 8. More concretely, it is as follows.

According to the data recording method of the present invention, plural audio signals are separated from among the received digital data and each audio signal is recorded respectively from the leading address of the recording segment formed on the disc. Thus, it becomes easy to access, reproduce or record a particular audio signal alone on the disc at the time of reproduction or at the time of recording by replacement. And therefore, the effect is got that a particular audio signal can be easily outputted alone or a particular audio signal can be easily replaced alone.

And according to the data recording method of the present invention, in the case that a signal on the disc is replaced, digital data is separated into plural audio data only at the time of recording. Therefore, a wasteful reproduction of the signal is unnecessary, the data amount to be recorded is small and the signal amount to be processed is small. And therefore, the effect is got that the software data processing by using a compact and inexpensive microprocessor becomes possible.

And the effect is got that data recording by using a disc of a slow access speed is realized because the data amount which is reproduced from, and is recorded on, the disc can be reduced.

The present invention has the effect that a data recording method, in which a disc is used as a recording medium, is realized wherein it is easy to selectively replace and record the audio data of a particular channel (post-recording or the like) by gathering the audio data of a particular channel together from among the audio data of plural channels which are included in the received digital data and are of short data length and are dispersed, and by recording. This data recording method has the effect that no interruption or skipping of the video or the audio occurs on the TV screen.

The present invention generates a multi-audio block by combining plural audio blocks in addition to the above-described effect.

Thereby, the effect is got that a signal can be recorded with a few times of access to the disc.

As for the disc such as in a hard disc device, not only the time required for recording and reproduction but also the time required for the head to access the places to be recorded or to be reproduced is long. A data recording method can be realized wherein the data processing ability of the data recording device as the whole is enhanced by storing a certain number of audio blocks in the buffer memory (multi-audio block) and by recording the multi-audio block in a lump on the disc with one access of the head instead of recording individual audio blocks on the disc at each frame.

The present invention generates data of the integer times of 512 bytes by adding dummy data to the multi-audio block and records the data on a disc instead of generating data of the integer times of 512 bytes by adding dummy data to individual audio blocks and recording it on a disc. Thereby, it has the effect that the total amount of the dummy data can be made small.

The invention is a data recording method according to Claims 8 characterized in that said digital data is digital data of a DV format which includes the audio signals of plural channels, and said first audio block and said second audio block comprise a pair of stereo audio signals respectively.

In addition to the above-described effect of the invention according to Claims 8, the present invention has the effect that a data recording method is realized wherein, particularly in a data recording device which records digital data of a DV format, respective audio signals of two stereo audio signals included in the DV format can easily be accessed and it is easy to reproduce a particular stereo audio signal alone and to replace a particular audio signal alone.

The invention is a data recording device characterized by comprising:

a disc which can record and reproduce digital data; and a buffer memory which records first digital data reproduced from said disc in the unit of a data block of a constant data length and which records received second digital data in correspondence with said data block, wherein said second digital data is recorded in a memory region on said disc where a part of said first digital data in correspondence with said second digital data had been recorded.

The present invention once records the first digital data (for example, video signal and audio signals or the like) into a buffer memory which is reproduced from said disc in the unit of a constant data length.

During a normal reproduction the data in the buffer memory is outputted as they are. Or, the data in the buffer memory is multiplexed with another signals, is encoded and is outputted.

In the case of post-recording (or insert editing), second digital data is stored in the buffer memory in correspondence with the above first digital data. The second digital data (for example, audio signal) is recorded in a memory region on the disc where other part (for example, audio signal) of that first digital data has been recorded.

Furthermore, a part of the first digital data (for example, video signal or audio signal) and the second digital data (for example, audio signal) may be multiplexed and outputted.

In a conventional device the minimum unit of recording from and reproduction onto the disc is the minimum recording unit of editing (post-recording or the like) as it is. The present invention has the effect that editing in a time unit smaller than the minimum unit for recording from and reproduction onto the disc is made possible.

In one embodiment the data recording device of the present invention records data, which was on the disc, in a buffer memory in the unit of a multi-audio block of a constant data length (assumed to be formed of sixteen audio blocks). At the same time when the user presses an post-recording button, another audio signal for post-recording starts to be recorded in the buffer memory in correspondence with this multi-audio block.

For example, it is assumed that the post-recording is started from the fifth audio block of the sixteen audio blocks included in one multi-audio block.

The data recording device of the present invention multiplexes the first to the fourth audio blocks of the multi-audio block recorded on the disc, the fifth to the sixteenth audio blocks of another audio signal for post-recording and other signals (for example, video signal), and outputs them.

And the data recording device of the present invention generates one multi-audio block by combining the first to the fourth audio blocks of the multi-audio block recorded on the disc and the fifth to the sixteenth audio blocks of another audio signals for post-recording, and records this multi-audio block in the region on the disc where the original multi-audio block has been recorded.

In another embodiment, the data recording device of the present invention records data, which was on the disc, in a buffer memory in the unit of a multi-audio block of a constant data length (formed of 3,600 bytes of the audio data). At the same time as the user presses the post-recording button another audio signal for post-recording starts to be recorded in the buffer memory in correspondence with said audio block.

The data recording device of the present invention may multiplex the audio signal which is up to the first borderline of data division after the start of post-recording and which has been the audio block recorded on the disc and other audio signal which is after this first borderline of data division, and may output the multiplexed audio signal.

And the data recording device of the present invention generates one audio block by combining the audio signal which is up to the first borderline of data division after the start of post-recording and which has been the audio block recorded on the disc and other audio signal which is after this first borderline of data division, and record the multiplexed audio signal in the region on the disc where the original audio block has been recorded.

As described above, the present invention has the effect that editing in a time unit smaller than the minimum unit of recording from and reproduction onto the disc is made possible.

The borderline of audio data division is, for example, each borderline between a video frame and a next video frame, or a borderline between a frequency spectrum group which has been converted in the frequency division in a constant time unit and the next frequency spectrum group which is sequential along the time axis and which has been converted in the frequency division in a constant time unit.

The invention characterized in that said first digital data includes a video signal or an audio signal, and said second digital data is an audio signal or a video signal.

The present invention has the effect, particularly in a data recording device which uses a disc where signals including a video signal and an audio signal are recorded, that editing in the time unit smaller than the minimum unit of recording from and reproduction onto the disc is made possible.

The invention is a data recording device according to Claim 13 characterized in that said constant data length is N frame(s) (N is a positive integer, including 1).

The present invention has the effect that editing in the time unit smaller than N frames, which is the minimum unit of recording from and reproduction onto the disc, is made possible.

The invention characterized by comprising:

a disc which can record and reproduce digital data; and a buffer memory which records first digital data reproduced from said disc in the unit of a data block of a constant data length and which records received second digital data in correspondence with said data block, wherein at least one signal among the video signals or the audio signals included in said first digital data and at least one signal among the video signals or the audio signals included in said second digital data are compared in, at least, format or encoding system, and in the case that the two are different the video signal or the audio signal included in said second digital data is converted into the signal which is of the same format or of the same encoding system as that of the video signal or the audio signal included in said first digital data, and the converted video signal or the converted audio signal can be recorded on the disc.

In the multimedia era there are cases in which recorded signal and another signal for insert editing may differ in format or in encoding system. In such cases, a conventional data recording device cannot carry out editing.

For example, when a conventional video signal (for example, NTSC signal) is recorded on the disc, a video signal of high resolution (for example, HDTV signal) cannot be recorded by insert editing in a conventional device.

In general there is a risk that signals in other regions (for example, attribute data) may be destroyed by the data which has overflowed from the originally allocated region for the video signal to invade other regions at the time of insert editing because a video signal of high resolution has a bigger data amount than a conventional video signal.

For example, in the case that a video signal recorded on the disc and another video signal for insert differ in format or in encoding system, the present invention records the video signal recorded on the disc and the another video signal for insert once in a buffer memory, compares both of them and then, in the case that they are different in format or the like, converts another video signal for insert into the signal which is of the same format or the like as that of the video signal originally recorded on the disc, and can record that another video signal on the disc.

Accordingly, in the above-described example insert editing can be carried out without destroying other signals and so on because the video signal of high resolution for insert editing is converted in format into the conventional video signal.

And the present invention has the effect that it can edit a signal of an arbitrary format even in the case that signals of plural formats get mixed together on the disc because it reads out the video signals recorded on the disc, records the video signals onto the buffer memory, and judges the format of the video signals.

The case where only the level of quantization differs (bit-figures of data are eliminated in accordance with a certain conversion table) is included in the case where "format or encoding system differs." Because there are cases where another video signal is intended to be recorded by insert and the data amount of another video signal cannot be stored in the region where the original video signal is recorded due to the difference in the level of quantization while the data amount can be reduced by reducing the bit-figures of quantization and that reduced another video signal can be recorded by insert in the region where the original video signal has been recorded.

In the case that the signal originally recorded on the disc is a video signal of high resolution and another signal for insert editing is a conventional signal of NTSC or the like, insert editing is possible without carrying out a format conversion because another video signal intended for insert editing has a smaller data amount, though both have different formats.

Accordingly, there may be cases where no format conversion is carried out even when the format or the like of both signals differs though the invention is an invention which converts another signal in format in the case that a signal originally recorded on the disc and that another signal intended for editing differ in format or the like.

In the same format a video signal (and an audio signal) of each frame has, preferably, a data length of a fixed length.

In the case that the data length changes in accordance with the characteristics of the image (or the audio), the data amount changes due to the difference of the characteristics between the originally recorded signal and the new signal to be recorded and, therefore, some means is necessary in order to make the data amounts of the original signal and the new signal equal to carry out insert editing.

However, in the case that the data length of the video signal (and audio signal) of each frame is a fixed length in accordance with the format, insert editing is easy because the original signal and the new signal have the equal data amount by format conversion of mew signal.

The invention is a data recording method characterized by comprising:

the step of reproducing first digital data from a disc and of recording said first digital data in a buffer memory in the unit of a data block of a constant data length;

the step of recording received second digital data in said buffer memory in correspondence with said data block; and the step of recording said second digital data in a memory region on said disc where a part of said first digital data has been recorded in correspondence with said second digital data.

The present invention has the effect that editing in a time unit smaller than the minimum unit of recording from and reproduction onto the disc is made possible.

Though the novel characteristics of the invention are nothing more than the particular description in the attached claims, with respect to both the configuration and the contents together with other purposes and characteristics, the present invention will be better understood and evaluated from the following detailed description which is to be understood in conjunction with the drawings.

BRIEF DESCRIPTION OF THE DRAWINGS

FIG. 6 is an illustrative diagram for describing a dummy data addition processing to DV data of a data recording and reproduction circuit in the first embodiment according to the present invention;

FIG. 20 is an illustrative diagram for describing a dummy data addition processing to the video data of a data recording and reproduction circuit of the data recording device in the fourth embodiment according to the present invention;

It should be taken into account that part of, or the entirety of, the drawings are a schematic representation for the purpose of illustration and do not necessarily represent faithfully relative dimensions or positions of actual elements which have been shown therein.

DETAILED DESCRIPTION OF THE INVENTION

In the following, preferable embodiments of the present invention are concretely cited and described.

Embodiment 1

In the following, the first embodiment which is one mode of a data recording device according to the present invention is described in reference to FIGS. 1 to 7.

Figure 1:
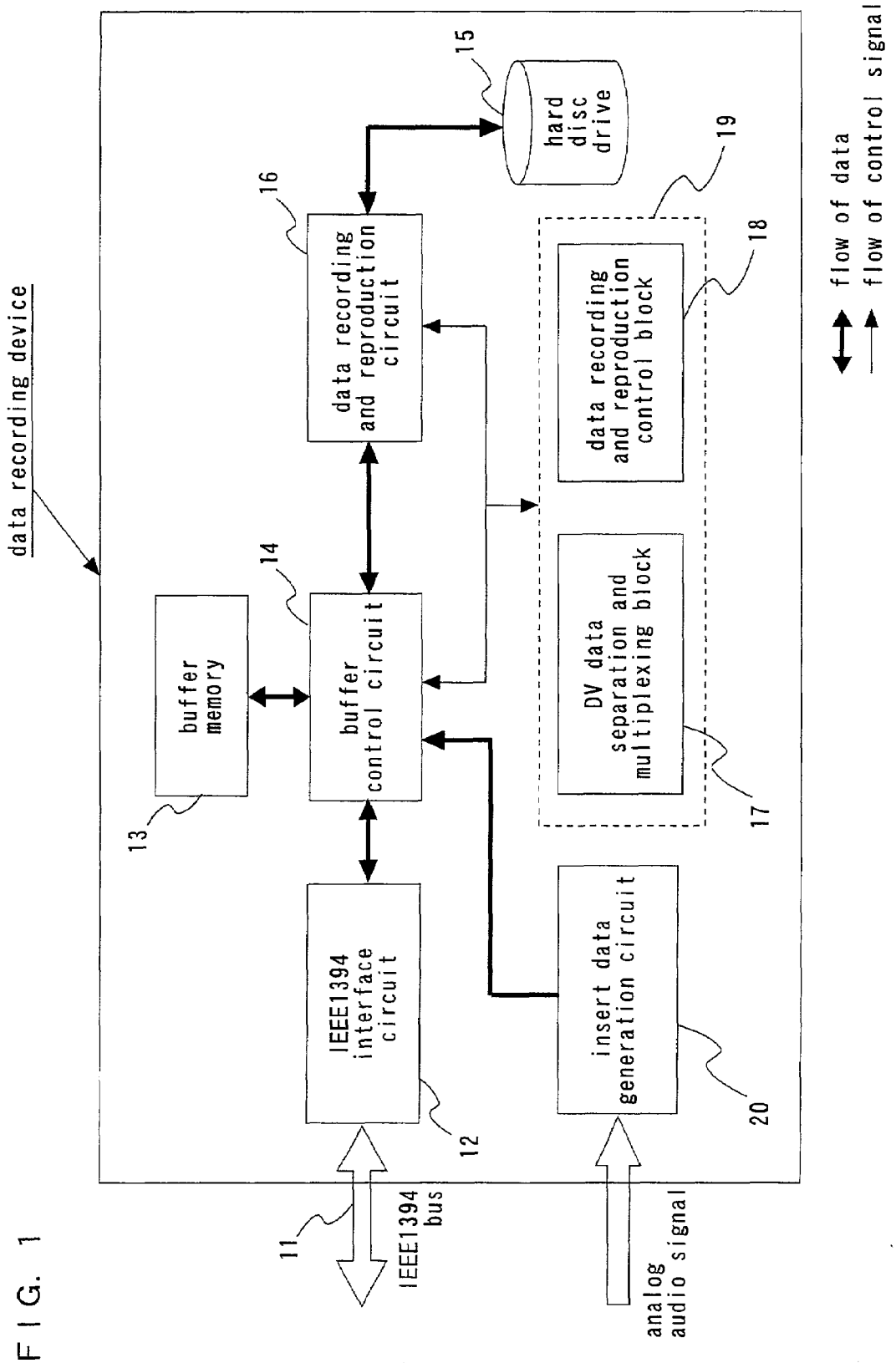
FIG. 1 is a block diagram of a data recording device in the first embodiment according to the present invention.

<Description of FIG. 1>

Figure 2:
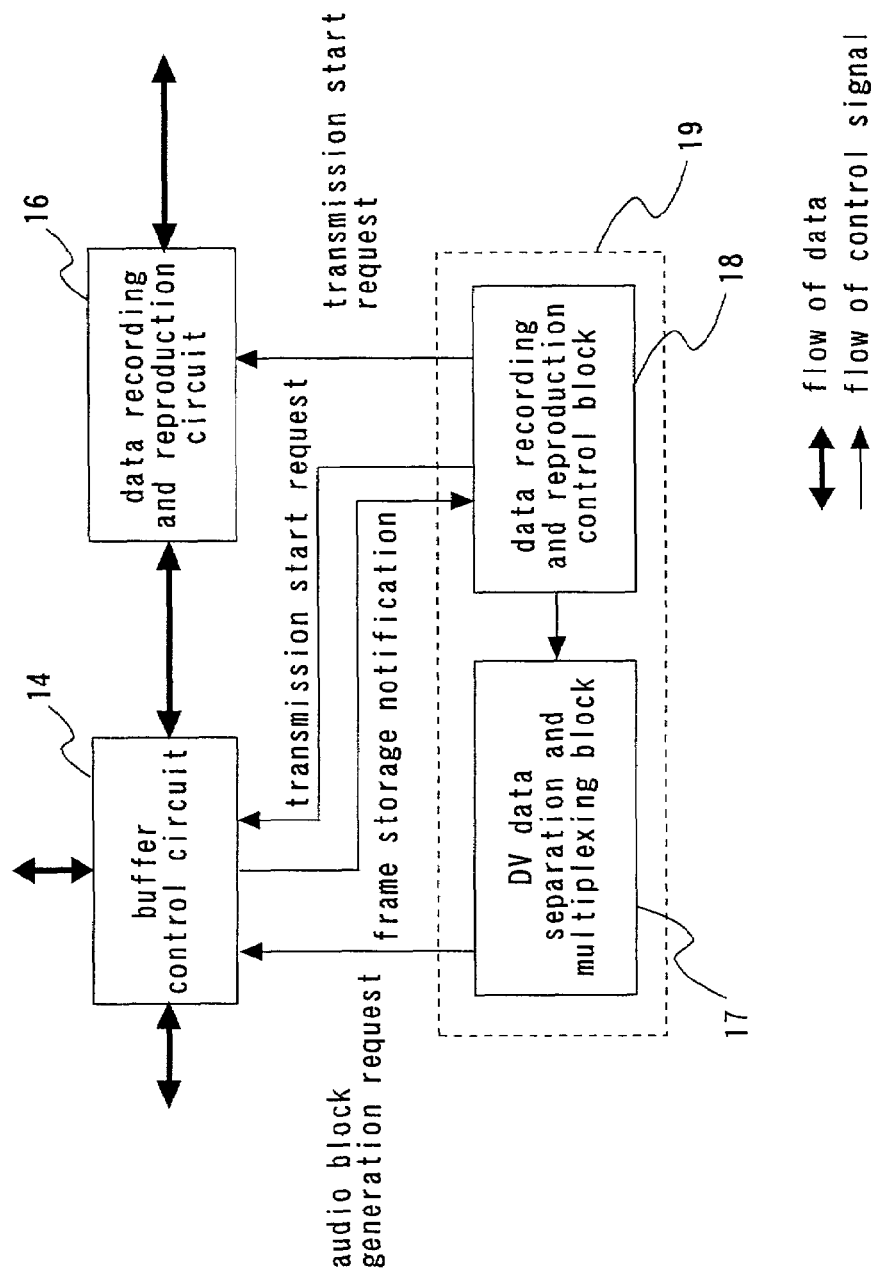
FIG. 2 is an illustrative diagram for describing the recording operation of the data recording device in the first embodiment according to the present invention.
Figure 3:
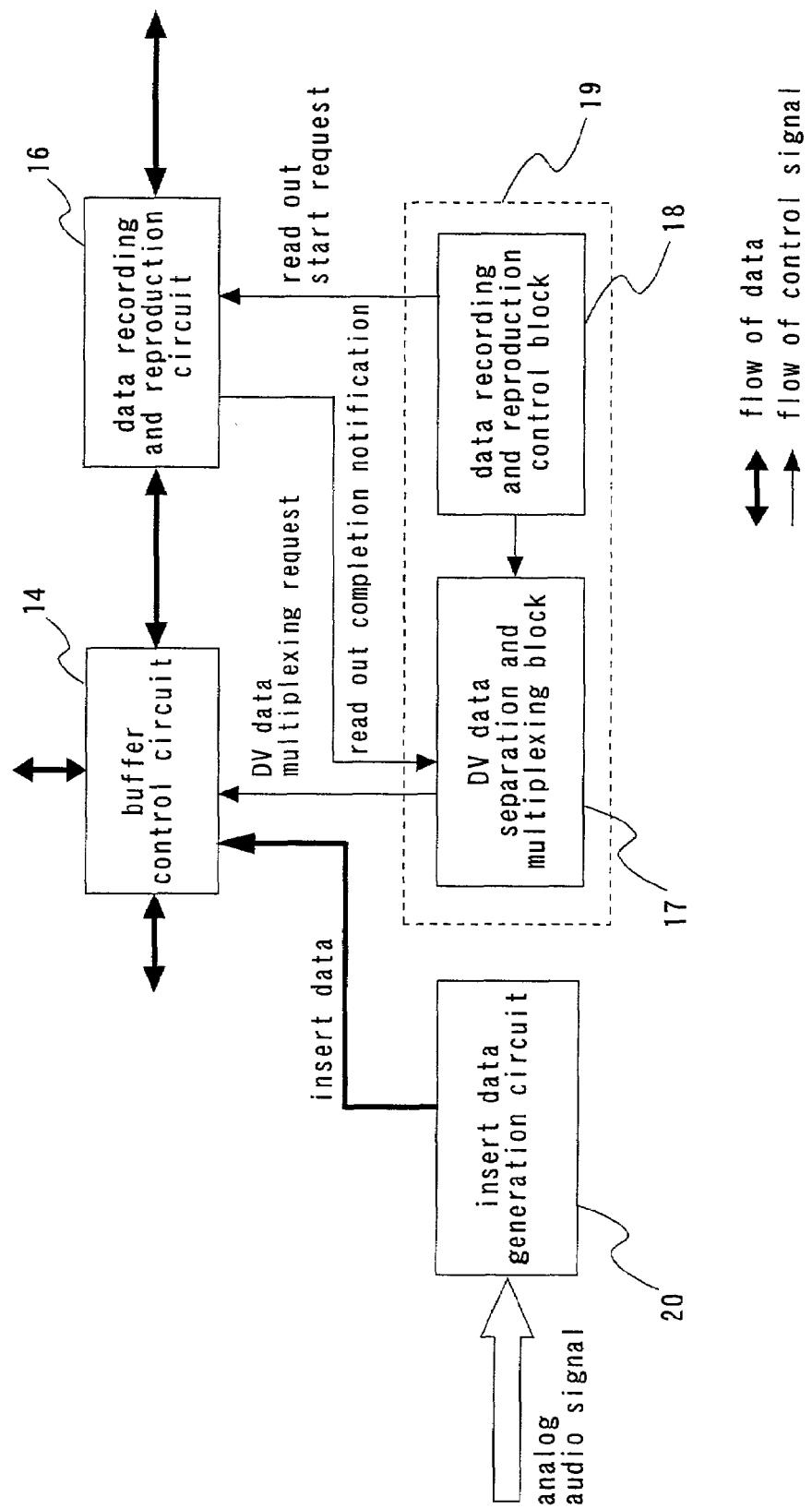
FIG. 3 is an illustrative diagram for describing the reproduction operation and audio editing operation of the data recording device in the first embodiment according to the present invention.

FIGS. 1, 2 and 3 are block diagrams showing a configuration of a data recording device according to the present invention.

The data recording device as shown in FIG. 1 is connected to an IEEE1394 bus 11 which transmits the video and audio data from an external apparatus such as a PC or a DV apparatus, and comprises an IEEE1394 interface circuit 12 which is an interface part for sending and receiving the video and audio data (DV data) in a DV format and commands such as REC (record request), PLAY (reproduction request) and the like via this IEEE1394 bus 11, a buffer memory 13 which can temporarily store data, a buffer control circuit 14 for controlling data input and output with respect to the buffer memory 13, a hard disc drive 15 which is a disc device that can record data, a data recording and reproduction circuit 16 as a data recording and reproduction part for carrying out writing in and reading out of data with respect to the hard disc drive 15, a CPU 19 and an post-recording data generation circuit (insert data generation circuit) 20 which converts a received analogue audio signal into the audio data in conformity with the DV data standard and which generates the audio data (hereinafter referred to as post-recording data) to be inserted into the DV data. The CPU 19 comprises a DV data separation and multiplexing block 17 (this is a block generation part) which, as a software processing block, has a function for generating an audio block at the time of recording and a processing function for multiplexing the audio data with respect to DV data at the time of reproduction, and a data recording and reproduction control block 18 as a data recording and reproduction control part which has a function of writing in and reading out data with respect to the hard disc drive 15.

Figure 4:
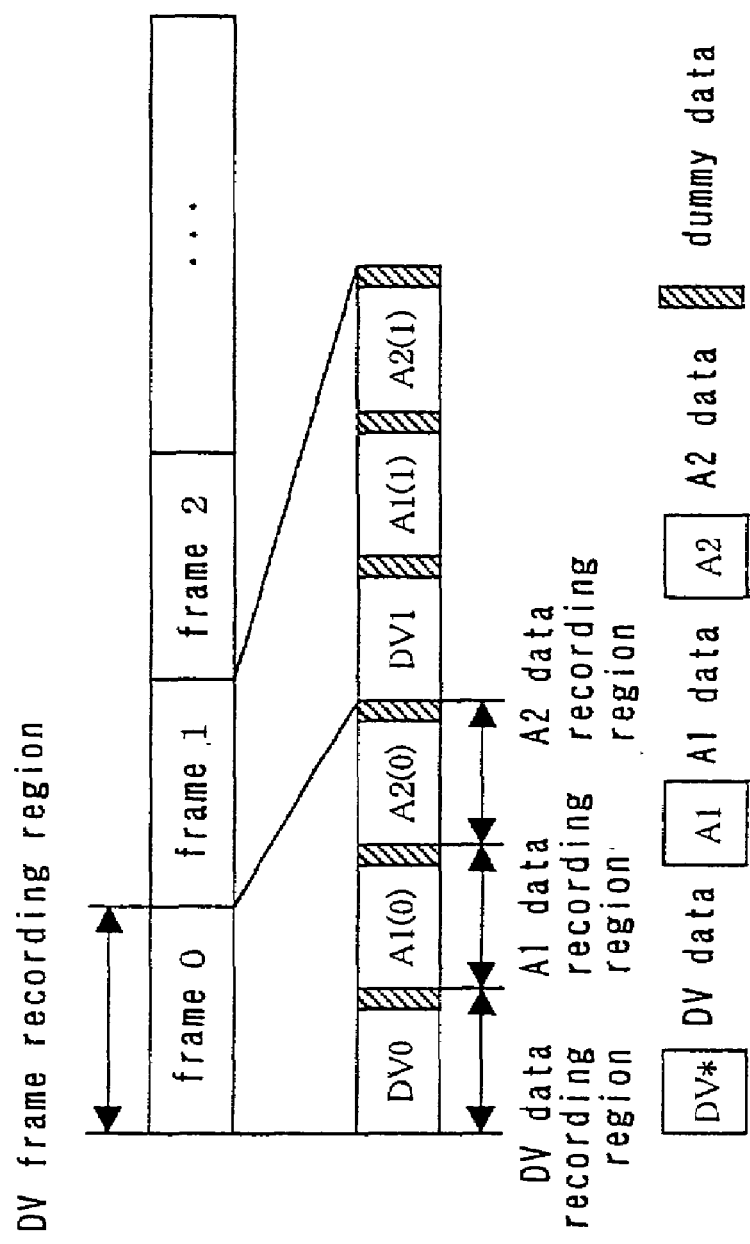
FIG. 4 is a layout diagram of a data recording region on a hard disc drive in the first embodiment according to the present invention.

<Description of FIG. 4>

A DV frame recording region for recording DV data in the frame unit is allocated in a hard disc drive 15 in the present embodiment as shown in FIG. 4. Each DV frame recording region is further divided into a DV data recording region, an A1 data recording region and an A2 data recording region, and is managed so that the leading address of each recording region agrees with the leading address of the sector.

The DV data recording region is a region which records DV data which is inputted through an IEEE1394 interface circuit 12 as they are.

The A1 data recording region is a region which records the first stereo audio signal (including left channel signal and right channel signal) included in the DV data.

The A2 data recording region is a region which records the second stereo audio signal (including left channel signal and right channel signal) included in the DV data.

Figure 5:
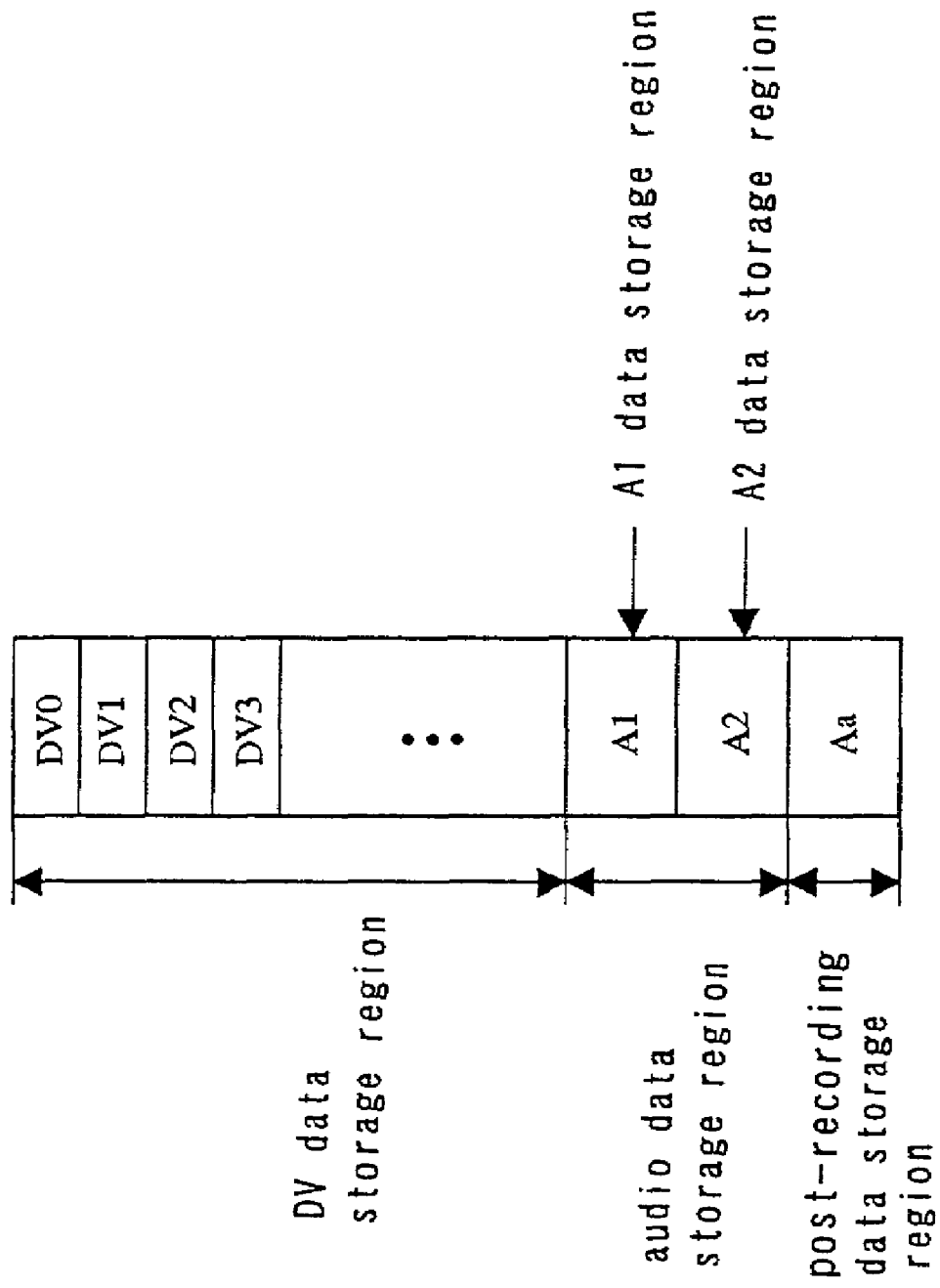
FIG. 5 is a layout diagram of a data storage region on a buffer memory of the data recording device in the first embodiment according to the present invention.

<Description of FIG. 5>

A DV data storage region, the A1 data storage region and the A2 data storage region are allocated in the buffer memory 13 (FIG. 1) for storing data to be recorded into or reproduced from the DV data recording region, the A1 data recording region and the A2 data recording region of a hard disc drive 15 respectively in the present embodiment as shown in FIG. 5. Furthermore, an post-recording data storage region is allocated for storing post-recording data at the time of audio editing which will be described later.

<Description of FIG. 2>

As for the data recording device configured as described above, the recording operation will be described in the case that a record request (REC command) is received from the outside.

The IEEE1394 interface circuit 12 receives DV data transmitted via the IEEE1394 interface bus 11 to transmit it to the buffer control circuit 14. The buffer control circuit 14 stores the DV data transmitted from the IEEE1394 interface circuit 12 in the DV data storage region on the buffer memory 13 in sequence as shown in FIG. 5.

The DV data storage region is a region on the buffer memory which stores the DV data transmitted from the IEEE1394 interface circuit 12 as it is.

The A1 data storage region is a region which stores the first stereo audio signal (including left channel signal and right channel signal) included in the DV data.

The A2 data storage region is a region which stores the second stereo audio signal (including left channel signal and right channel signal) included in the DV data.

At the time when DV data for one frame is stored on the buffer memory 13, the buffer control circuit 14 makes a notification to the data recording and reproduction control block 18 (frame storage notice of FIG. 2).

The data recording and reproduction control block 18 requests the audio block generation start of the DV data separation and multiplexing block 17 in accordance with the frame storage notice from the buffer control circuit 14. The DV data separation and multiplexing block 17 reads out audio data from DV data stored in the DV data storage region of the buffer memory 13 in accordance with the audio block generation start request from the data recording and reproduction control block 18, and writes the audio data in an audio data storage region on the same buffer memory 13. In this case, the audio data corresponding to five DIF sequences (0 to 4) from the lead of the frame are stored in the A1 data storage region and the audio data corresponding to the remaining DIF sequences (5 to 9) are stored in the A2 data storage region.

As described above, an audio block of A1 data and an audio block of A2 data which are extracted from the DV frame are generated in the A1 data storage region and the A2 data storage region on the buffer memory 13.

As described above, the first stereo audio signal is stored in the A1 data storage region and the second stereo audio signal is stored in the A2 data storage region based on the DV data received by the data recording device in the present embodiment. Thereby, two stereo audio data in the DV data can be separately converted to audio blocks.

Here, the video data and attribute data (header section H0 and so on) in the data recorded in the DV data storage region are added with 320 bytes of dummy data, and are recorded in the DV data recording region on the hard disc in their original DV data form in the present embodiment.

The data recording and reproduction control block 18 requests the DV data transmission start of the buffer control circuit 14 and the data recording and reproduction circuit 16 when the above-described audio block generation processing is completed. The buffer control circuit 14 reads out the DV data (the signal as it is received by the data recording device, and the video data and attribute data are substantially effective data) for one frame (data of 10 DIF sequences, 120,000 bytes) in sequence from the buffer memory 13 in accordance with the DV data transmission start request from the data recording and reproduction control block 18, and transmits them to the data recording and reproduction circuit 16.

<Description of FIG. 6>

The data recording and reproduction circuit 16 adds dummy data (320 bytes) to the DV data (120,000 bytes) for one frame which is transmitted from the buffer control circuit 14 as shown in FIG. 6, converts the DV data into a block which agrees with the integer times of the recording segment (sector: 512 bytes) of the hard disc, and records the DV data in a DV data recording region (see FIG. 4) of the hard disc drive 15. The DV data which has been converted to a block is recorded from the leading address of the recording segment formed on the disc.

Figure 7:
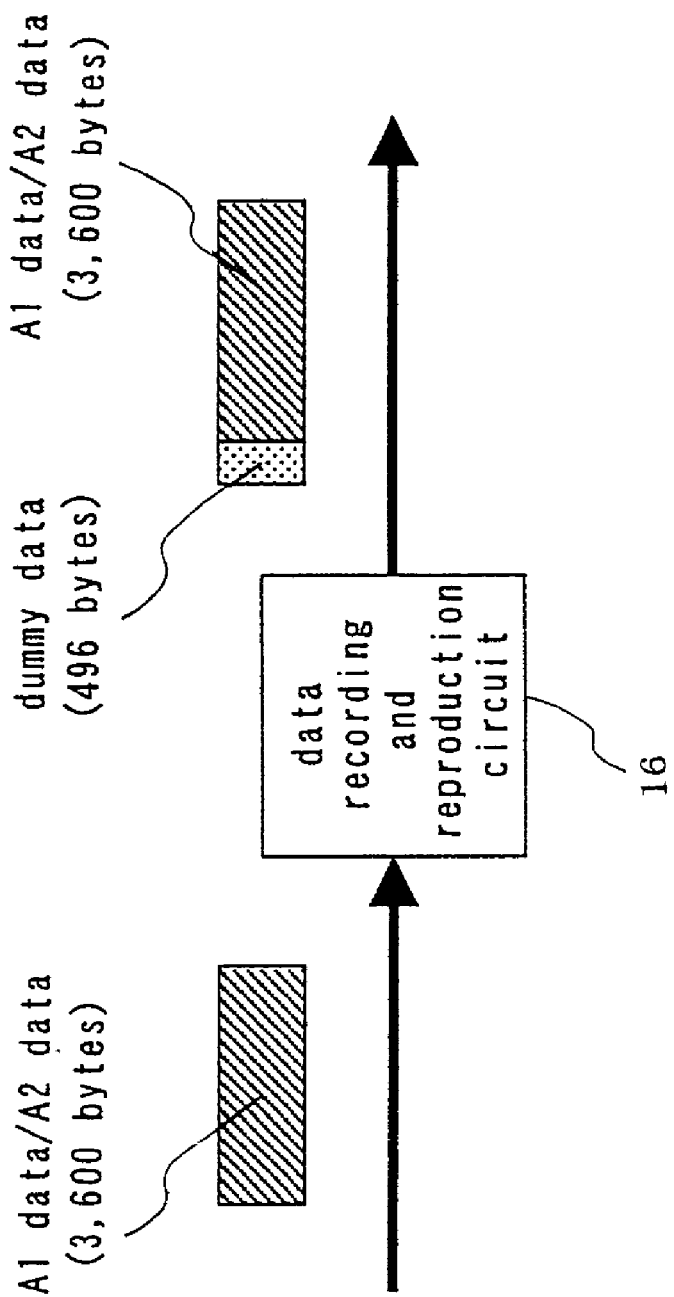
FIG. 7 is an illustrative diagram for describing a dummy data addition processing to the audio data of a data recording and reproduction circuit in the first embodiment according to the present invention.

<Description of FIG. 7>

The data recording and reproduction control block 18 then sends the buffer control circuit 14 the request for the A1 data transmission start from the buffer memory 13. The buffer control circuit 14 reads out A1 data (3,600 bytes) from the buffer memory 13 in accordance with the A1 data transmission start request, and transmits it to the data recording and reproduction circuit 16. The data recording and reproduction circuit 16 adds dummy data (496 bytes) to the A1 data which is transmitted from the buffer control circuit 14 as shown in FIG. 7 so as to have the data length of the integer times of the sector unit (3,600+496=512×8), and records the A1 data in the A1 data recording region of the hard disc drive 15. The A1 data to which dummy data is added is recorded from the leading address of the recording segment formed on the disc.

When the recording processing with respect to the A1 data is completed, the data recording and reproduction control block 18, the buffer control circuit 14 and the data recording and reproduction circuit 16 record the A2 data in the A2 data recording region on the hard disc drive 15 in the same manner.

The data recording device of the present embodiment carries out the above-described processing repeatedly at each DV frame.

As described above, the data recording device of present embodiment is configured to generate two audio blocks on the buffer memory by extracting audio data from the DV data received from the outside and to record the DV data and each of the generated audio blocks in separate recording regions which have been divided in the sector unit.

Next, the reproduction operation in the case that the data recording device has received a reproduction request (PLAY command) from the outside is described.

The data recording and reproduction control block 18 controls the data recording and reproduction circuit 16 and the buffer control circuit 14, reads out DV data (substantially video data, attribute data and so on) of frame 0 from the DV data recording region of the hard disc drive 15, and stores the DV data in the DV data storage region (DV 0) on the buffer memory 13 after the removal of dummy data. Next, A1 data A1(0) and A2 data A2(0) of frame 0 are read out from the A1 data recording region and the A2 data recording region of the hard disc drive 15, stores them respectively in the A1 data storage region and A2 data storage region on the buffer memory 13 after the removal of the dummy data.

The DV data, the A1 data and the A2 data have the data length of the integer times of the recording segment of the disc and respective data are recorded from the leading address of the recording segment on the disc so that they can be separately and independently written into the disc and can be read out from the disc.

When the above-described storage of the DV data (substantially video data, attribute data and so on), the A1 data and the A2 data is completed, the DV data separation and multiplexing block 17 requests the DV data multiplexing start of the buffer control circuit 14 as shown in FIG. 3. The buffer control circuit 14 reads out the A1 data and the A2 data on the buffer memory 13 in accordance with the DV data multiplexing start request, and writes them into predetermined positions in the DV data storage region on the buffer memory 13 (see FIG. 26 with respect to predetermined positions, hereinafter this processing is referred to as multiplexing processing).

The data recording and reproduction control block 18 reads out DV data (substantially video data, attribute data and so on) of frame 1 from the DV data recording region on the hard disc, and writes them in the DV data storage region (DV1) on the buffer memory 13 after the removal of the dummy data in the same manner as described above. Then, the A1 data A1 (1) and the A2 data A2 (1) of frame 1 are read out respectively from the A1 data recording region and the A2 data recording region on the hard disc, and writes them respectively into the A1 data storage region and the A2 data storage region of the buffer memory 13 after the removal of the dummy data. When the above-described processing is completed, the DV data separation and multiplexing block 17 controls the buffer control circuit 14 to write the A1 data A1 (1) and the A2 data A2 (2) in predetermined positions of the DV data storage region (DV1) (DV data is stored) so as to be multiplexed.

At the time when multiplexed DV data are generated wherein the A1 data and the A2 data are written in the DV data storage region by repeating the above-described processing for the predetermined number of frames, the transmission of these multiplexed DV data to the IEEE1394 bus 11 is started.

After that, at the time when the number of the multiplexed DV data on the buffer memory 13, which haven't been transmitted to the IEEE1394 bus 11, becomes fewer than the predetermined number of frames, data are read out from the hard disc drive 15 and multiplexing processing is carried out on the buffer memory 13. In this manner, the multiplexed DV data are transmitted to the IEEE1394 bus 11 in sequence.

As described above, the data recording device of the present embodiment generates the multiplexed DV data on the buffer memory 13 from the DV data (substantially video data, attribute data and so on), the A1 data and the A2 data which are recorded in separate regions on the hard disc drive 15, and reproduces and transmits the multiplexed DV data onto the IEEE1394 bus 11.

<Description of FIG. 3>

Next, the audio editing operation in the case that the data recording device receives an audio editing request (post-recording) from the outside is described.

The data recording device in the present embodiment can convert the inputted analogue audio signal into post-recording data in the DV format, and can record it in a predetermined audio data recording region of the hard disc drive 15 while carrying out a reproduction processing of the video signal and the audio signals recorded on the hard disc as described above.

During PLAY operation DV data (substantially video data, attribute data and so on), the A1 data and the A2 data are read out from the DV data recording region and so on of the hard disc drive 15 in sequence, they are stored in the DV data storage region and so on in the buffer memory 13 after the removal of the dummy data, and furthermore, the A1 data and the A2 data are multiplexed with DV data (substantially video data, attribute data and so on) so as to generate multiplexed DV data as described above. When a predetermined number of multiplexed DV data are stored on the buffer memory 13, the multiplexed DV data start to be transmitted to the IEEE1394 bus 11. The operation as described above is the same as the above-described reproduction processing.

When the user presses the post-recording button, the post-recording data generation circuit 20 converts the received analogue audio signal into the audio data (insert data) in the DV format by synchronizing with the start of transmission of the multiplexed DV data to the IEEE1394 bus 11, and transmits the audio data to the buffer control circuit 14 in sequence. The buffer control circuit 14 stores the post-recording data (insert data) which have been transmitted from the post-recording data generation circuit 20 in the post-recording data storage region Aa (FIG. 5) on the buffer memory 13. The buffer control circuit 14 makes a notification of completion of storage of the post-recording data to the data recording and reproduction control block 18 at the time when the post-recording data for one frame is stored in the post-recording data storage region Aa.

The data recording and reproduction control block 18 controls the buffer control circuit 14 and the data recording and reproduction circuit 16 in accordance with the post-recording data storage notification from the buffer control circuit 14 to read out the post-recording data on the buffer memory 13 to record the post-recording data in the A2 data recording region of the hard disc drive 15 after adding dummy data of 496 bytes (see FIG. 7). The post-recording data to which the dummy data is added, is recorded from the leading address of the recording segment formed on the disc.

It is possible to record new audio data in the A2 data region on the hard disc drive 15 by the processing as described above.

And the multiplexed DV data after the start of post-recording may be generated by multiplexing the DV data, which has been read out from the hard disc and has been written into the buffer memory 13 (DV data storage region) after the removal of the dummy data, with the audio data which has been read out from the hard disc and from which the dummy data is removed (A1 data storage region) and with the audio data which has been newly inserted and recorded (post-recording data storage region Aa), and may be transmitted to the IEEE1394 bus 11.

As described above, it is possible for the data recording device of the present embodiment to easily replace the audio data recorded on the hard disc drive 15 with the inputted analogue audio data for post-recording while reproducing data recorded on the hard disc drive 15.

There are some cases where the audio data for post-recording are inputted through the IEEE1394 bus 11, and these processing contents are the same as in the above-described Embodiment 1.

In the buffer memory of FIG. 5, in the case that the starting point of post-recording is during the time that the audio data (the audio block) are being stored in the audio data storage region (A1 data storage region and A2 data storage region), the first borderline of the audio data division of the A2 data after the start of the post-recording is found.

A new audio block is generated from the A2 data read out from the disc from the beginning of the audio block to this borderline of the audio data division, and from the post-recording data from this borderline of the audio data division to the end of the audio block.

This new audio block and other signals (DV data and A1 data) are multiplexed and outputted.

And after the dummy data of 496 bytes is added, this new audio block is recorded in the region on the disc where the original audio block has been recorded. The audio block to which the dummy data are added is recorded from the leading address of the recording segment formed on the disc.

In this manner, two signals which belong to the same data block, the digital data (first digital data) which has originally been recorded on the hard disc and other digital data (second digital data) which is intended to be newly recorded by editing (post-recording or the like), are multiplexed so as to generate one data block and, by recording this data block on the hard disc, a data recording device can be realized which has the minimum recording unit which is shorter than the time length of the data block.

In the same manner, in the case that the end point of post-recording is during the time that the audio data is being stored in the audio data storage region (the audio block) in the buffer memory of FIG. 5, the first borderline of the audio data division of the A2 data after the end of post-recording is found.

A new audio block is generated from the post-recording data from the beginning of the audio block to this borderline of the audio data division, and from the A2 data read out from the disc from this borderline of the audio data division to the end of the audio block.

This new audio block and other signals (DV data and A1 data) are multiplexed and outputted.

And after dummy data of 496 bytes is added, this new audio block is recorded in the region on the disc where the original audio block has been recorded. The audio block, to which the dummy data are added, is recorded from the leading address of the recording segment formed on the disc.

Here, in another embodiment, by cutting the audio data off, the video data and so on with little waste can be newly generated and can be recorded. In this case, naturally, a process for cutting the audio data off becomes necessary.

Embodiment 2

In the following, the second embodiment which is one mode of a data recording device according to the present invention is described in reference to FIGS. 8 to 10.

Though the configuration of the present embodiment is the same as in FIG. 1, the operations of the buffer control circuit 14, the DV data separation and multiplexing block 17 and the data recording and reproduction control block 18 differ in comparison with the first embodiment.

Figure 8:
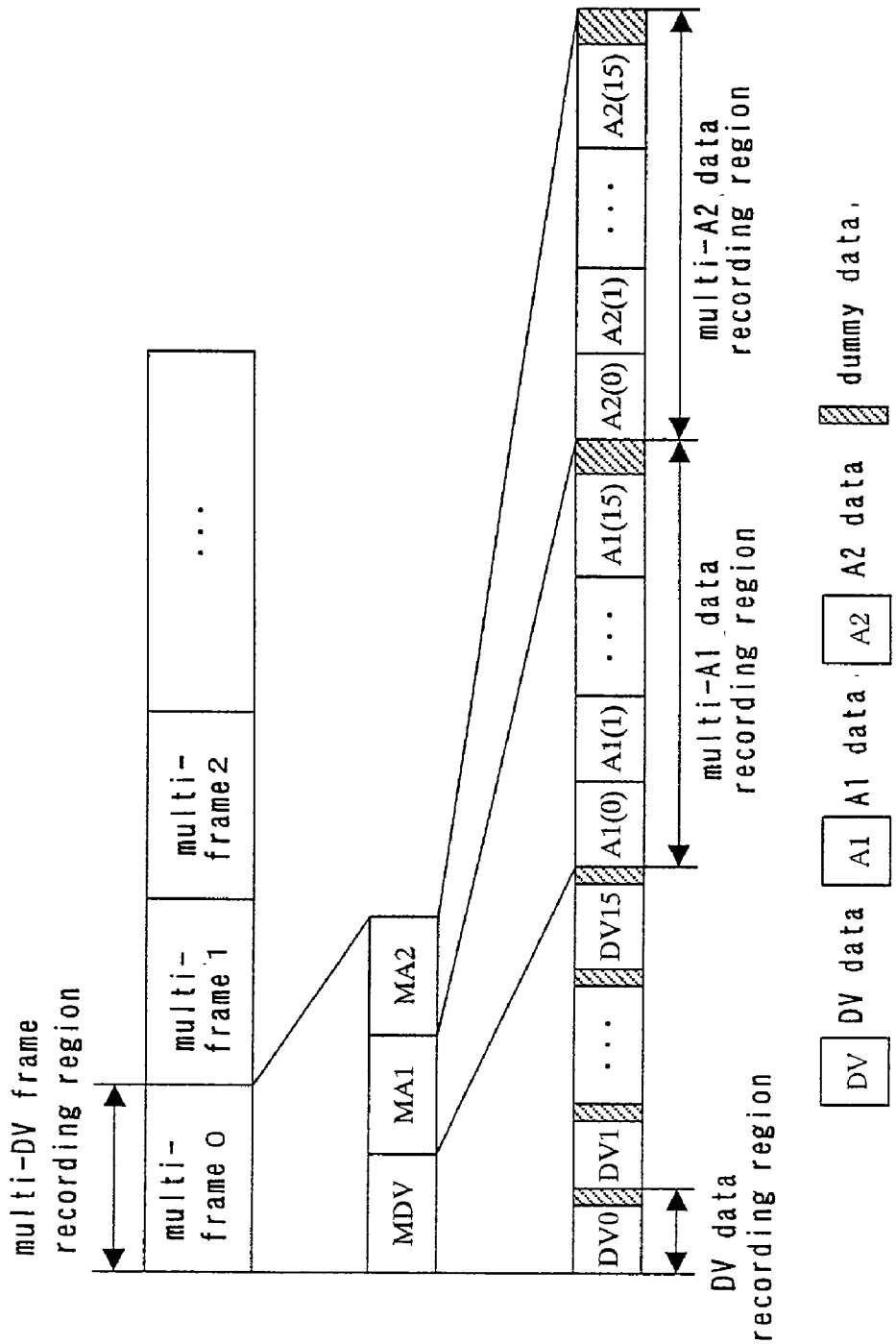
FIG. 8 is a layout diagram of a data recording region on a hard disc drive in the second embodiment according to the present invention.

<Description of FIG. 8>

The hard disc drive 15 in the present embodiment is provided with a multi-DV frame recording region for recording DV data at the unit of plural frames, as shown in FIG. 8. Each multi-DV frame recording region is divided into a multi-DV data recording region, a multi-A1 data recording region (MA1) and a multi-A2 data recording region (MA2), and the leading address of each recording region is managed to agree with the leading address of the sector.

The multi-DV data recording region is a region which records 16 frames of DV data (a signal of DV data inputted from the IEEE1394 bus 11 is recorded as it is, but substantially the video data, attribute data and so on).

The multi-A1 data recording region (MA1) is a region which records 16 frames of A1 data.

The multi-A2 data recording region (MA2) is a region which records 16 frames of A2 data.

Furthermore, the multi-DV data recording region is divided into plural DV data recording regions and is managed so that the leading address of each DV data recording region agrees with the leading address of the sector.

Figure 9:
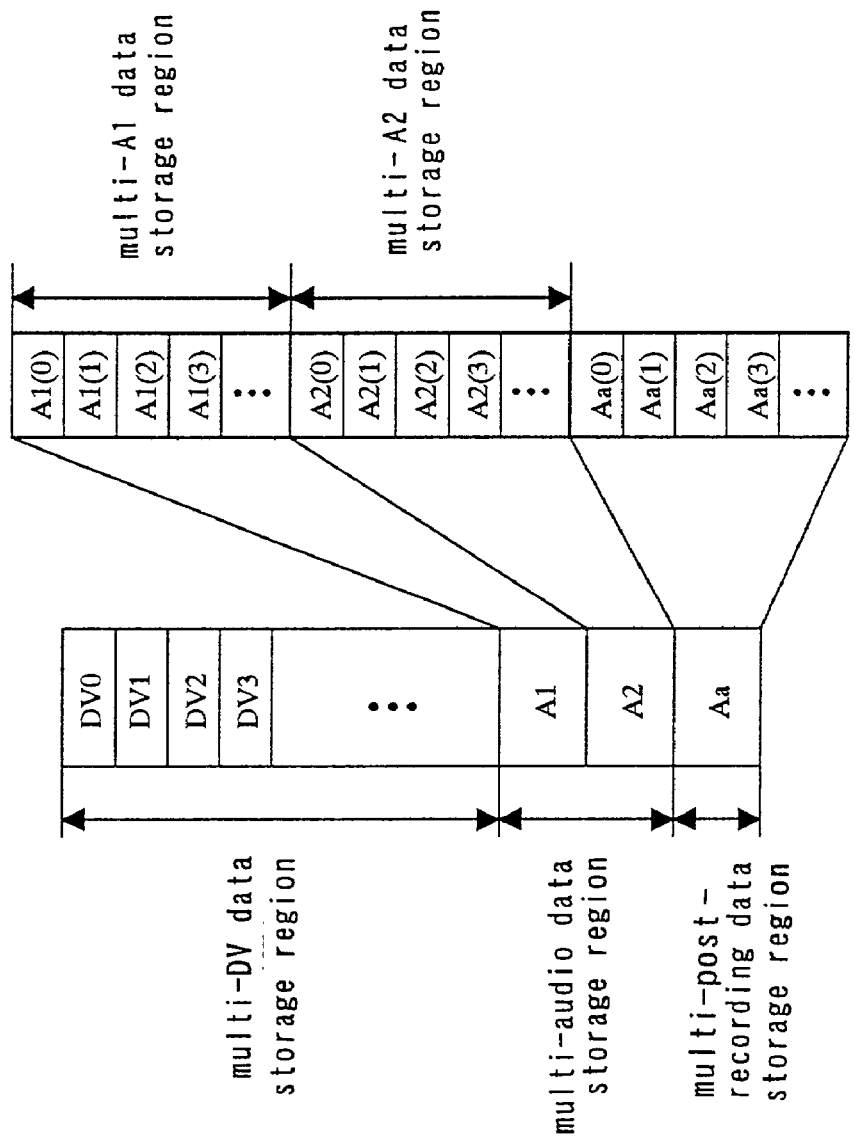
FIG. 9 is a layout diagram of a data storage region on a buffer memory of the data recording device in the second embodiment according to the present invention.

<Description of FIG. 9>

And, as shown in FIG. 9, a multi-DV data storage region, a multi-A1 data storage region and a multi-A2 data storage region are allocated in the buffer memory 13 in the present embodiment.

The multi-DV data storage region is a region which stores 16 frames of DV data (a signal of the DV data inputted from the IEEE1394 bus 11 as it is).

The multi-A1 data storage region (MA1) is a region which stores 16 frames of A1 data.

The multi-A2 data storage region (MA2) is a region which stores 16 frames of A2 data.

The multi-DV data storage region or the like is a region for storing data which are recorded into or reproduced from the multi-DV data recording region, the multi-A1 data recording region (MA1) and the multi-A2 data recording region (MA2) of the hard disc drive 15.

Furthermore, a multi-post-recording data storage region is allocated for storing 16 frames of the audio data which is to be inserted at the time of audio editing which will be described later.

In the following, the recording (REC) operation of the present embodiment is described in reference to the drawings.

DV data received from the IEEE1394 bus 11 is stored in a multi-DV data storage region on the buffer memory 13 in the same way as in the first embodiment. When the buffer control circuit 14 stores DV data for one frame in the buffer memory 13, notification of completion of storage to the data recording and reproduction control block 18 is made.

The data recording and reproduction control block 18 requests the audio block generation start of the DV data separation and multiplexing block 17 in accordance with the frame storage notification. The DV data separation and multiplexing block 17 extracts the audio data from among the DV data stored in the buffer memory 13, separates A1 data and A2 data in the same way as in the first embodiment, and stores them respectively in the A1 (0) of the multi-A1 data storage region and A2 (0) of the multi-A2 data storage region in accordance with the request for the audio block generation.

When the processing of the above-described generation of the audio blocks is completed, the data recording and reproduction control block 18 adds dummy data to the DV data and records it on the hard disc drive 15 in the same way as in the first embodiment. This DV data is recorded from the leading address of the recording segment.

In the following, A1 data and A2 data read out from the DV data are stored in each storage region (A1 (1), A1 (2), . . . ) of the multi-A1 data storage region and each storage region (A2 (1), A2 (2), . . . ) of the multi-A2 data storage region respectively in accordance with the frame storage notification.

On the other hand, the DV data are recorded in the multi-DV data recording region of the hard disc drive 15 in sequence. The DV data recorded on the hard disc drive 15 are the signals inputted from the IEEE1394 bus 11 as they are, but they are substantially the video data, attribute data and soon, (meaning signals except the audio data).

Furthermore, the data recording and reproduction control block 18 counts the number of data stored in the multi-A1 data storage region and the multi-A2 data storage region, and requests the transmission start of the A1 data for 16 frames (referred to as "multi-A1 data") and the A2 data for 16 frames (referred to as "multi-A2 data") of the buffer control circuit 14 and of the data recording and reproduction circuit 16 at the time when the A1 data and the A2 data are stored for 16 frames respectively.

The buffer control circuit 14 transmits the multi-A1 data (3,600×16=57,600 bytes) to the data recording and reproduction circuit 16 in accordance with the transmission start request.

Next, the buffer control circuit 14 transmits the multi-A2 data (3,600×16=57,600 bytes) to the data recording and reproduction circuit 16.

Here, the multi-A1 data and the multi-A2 data are generically referred to as multi-audio block data.

Figure 10:
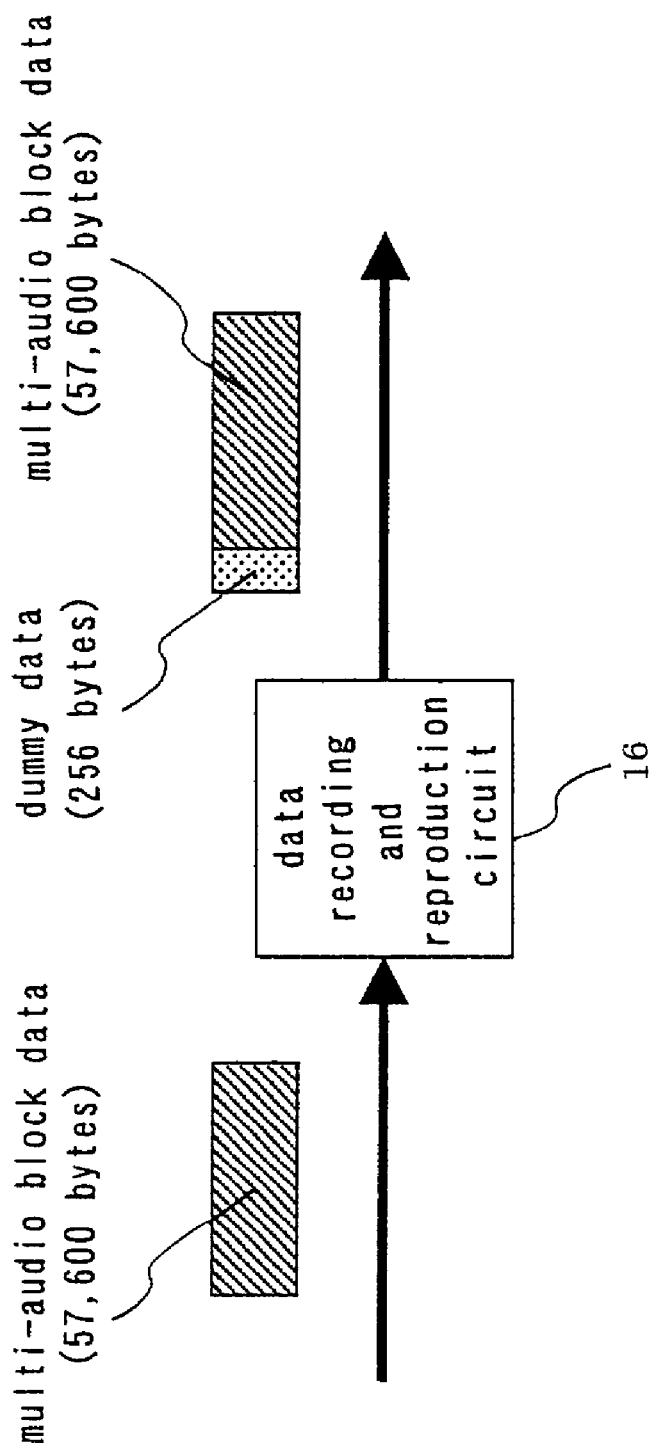
FIG. 10 is an illustrative diagram for describing a dummy data addition processing to multi-audio block data of a data recording and reproduction circuit in the second embodiment according to the present invention.

<Description of FIG. 10>

As shown in FIG. 10, the data recording and reproduction circuit 16 generates multi-audio block data of which the data amount is made to be the integer times of the sector unit (512 bytes) by adding dummy data of 256 bytes to the multi-A1 data transmitted from the buffer control circuit 14, and records this multi-audio block data in the multi-A1 data recording region of the hard disc drive 15.

Then, the data recording and reproduction circuit 16 generates multi-audio block data of which the data amount is made to be the integer times of the sector unit (512 bytes) by adding dummy data of 256 bytes to the multi-A2 data transmitted from the buffer control circuit 14, and records this multi-audio block data in the multi-A2 data recording region of the hard disc drive 15.

The multi-A1 data and the multi-A2 data are recorded from the leading address of the recording segments formed on the disc.

Next, the reproduction operation of the case where the data recording device has received a reproduction request (PLAY command) from the outside is described.

First, the data recording and reproduction control block 18 controls the data recording and reproduction circuit 16 and the buffer control circuit 14 to read out the multi-DV data, the multi-A1 data and the multi-A2 data from the multi-DV data recording region or the like of the hard disc drive 15 and stores them in the multi-DV data storage region, the multi-A1 data storage region and the multi-A2 data storage region on the buffer memory 13 after removing the dummy data.

The multi-DV data, the multi-A1 data and the multi-A2 data have the data length of the integer times of the recording segment of the disc and the respective data are recorded from the leading address of the recording segments of the disc. And therefore, they can be written onto the disc and read out from the disc separately and independently.

As for the DV data, though the multi-DV data may be read out in a lump, in general, each piece of DV data (for one frame) is read out because the data amount is large.

Next, the DV data separation and multiplexing block 17 requests the DV data multiplexing start of the buffer control circuit 14. The buffer control circuit 14 reads out the A1 data and the A2 data corresponding to the first DV data, which have already been stored in the buffer memory, from the multi-A1 data storage region and the multi-A2 data storage region, and writes them into a predetermined position of the multi-DV data storage region wherein the first DV data had been stored, so as to be multiplexed, in accordance with the DV data multiplexing start request.

The data recording and reproduction control block 18 reads out the DV data which is to be reproduced for the second time from the multi-DV data recording region on the hard disc in the same way as described above, and writes it into the next region of the multi-DV data storage region on the buffer memory 13 after removing the dummy data. Next, the DV data separation and multiplexing block 17 controls the buffer control circuit 14 to read out the A1 data and the A2 data corresponding to the this DV data from the multi-A1 data storage region and the multi-A2 data storage region and to write them into a region of the multi-DV data storage region wherein this DV data is stored so as to be multiplexed.

In the following, the following DV data are read out in the same way and the writing processing (multiplexing processing) of the corresponding A1 data and A2 data is continued.

After repeating the above-described process for a predetermined number of frames, the feeding of the multiplexed DV data into the IEEE1394 bus 11 is started. After that, at the time when the number of the multiplexed DV data which haven't been fed into the IEEE1394 bus 11 on the buffer memory 13 becomes fewer than a predetermined number, the DV data (substantially the video data, attribute data and so on) and so on are read out from the hard disc drive 15, a multiplexing processing is carried out on the buffer memory 13, and the multiplexed DV data are fed out through the IEEE1394 bus 11 in sequence.

The DV data is read out from the hard disc 16 times while the multi-A1 data and the multi-A2 data are read out from the hard disc once because the multi-A1 data and the multi-A2 data for 16 frames are read out in a lump from the hard disc and the DV data is read out from the hard disc at each frame.

As described above, the data recording device of the present embodiment multiplexes the DV data (substantially the video data, attribute data and so on), the A1 data and the A2 data, which are recorded in separate regions on the hard disc drive 15, on the buffer memory 13 after removing the dummy data, and reproduces and feeds out the multiplexed DV data onto the IEEE1394 bus 11.

The audio editing operation of the case where the data recording device has received an audio editing request from the outside is described.

The data recording device in the present embodiment can convert the inputted analogue audio signal into post-recording data in a DV format, and can record it in a predetermined audio data recording region of the hard disc drive 15 while carrying out the above-described reproduction processing.

First, the DV data (substantially the video data, attribute data and so on), the multi-A1 data and the multi-A2 data are read out from the DV data recording region and so on of the hard disc drive 15 in sequence, and the multiplexed DV data is generated in the multi-DV data storage region on the buffer memory 13, in the same way as the PLAY operation. When a predetermined frame number of multiplexed DV data are generated on the buffer memory 13, the multiplexed DV data starts to be fed out to the IEEE1394 bus 11. This operation is performed in the same way as is the above-described reproduction processing.

When the user presses the post-recording button, the post-recording data generation circuit 20 starts to convert the received analogue audio signal into post-recording data which is the audio data in the DV format and to transmit it to the buffer control circuit 14 in sequence in synchronization with the start of the feeding out of the multiplexed DV data to the IEEE1394 bus 11.

The buffer control circuit 14 stores the post-recording data which have been transmitted from the post-recording data generation circuit 20 in the multi-post-recording data storage regions (Aa (0), Aa (1), . . . ) on the buffer memory 13. The buffer control circuit 14 makes notification of completion of storage of post-recording data to the data recording and reproduction control block 18 at the time when the post-recording data for 16 frames have been stored in the buffer memory 13.

The data recording and reproduction control block 18 controls the buffer control circuit 14 and the data recording and reproduction circuit 16 in accordance with the post-recording data storage notification from the buffer control circuit 14 so that the post-recording data in the buffer memory are recorded in the multi-A2 data recording region of hard disc drive 15. At this time, the post-recording data, which are transmitted from the buffer control circuit 14, are 57,600 bytes which is equal to the multi-audio block data at the time of recording as shown in FIG. 10. The data recording and reproduction circuit 16 makes the data amount of the post-recording data be the data amount of the integer times of 512 bytes by adding dummy data of 256 bytes in the same way as in FIG. 10. Thereby, these data can be recorded in the recording segment (sector) on the hard disc without leaving any remainder.

These data are recorded from the leading address of the recording segment on the hard disc.

New audio data are recorded in the multi-A2 data recording region on the hard disc drive 15 through the above-described processing.

And the multiplexed DV data, which are generated by multiplexing the A1 data (stored in the multi-A1 data storage region. Dummy data are removed.) which are read out from the multi-A1 data recording region on the hard disc, and newly inserted and recorded post-recording data (stored in the multi-post-recording data storage region Aa) with the DV data (stored in the multi-DV data storage region. Dummy data is removed.) which are read out from the multi-DV data recording region on the hard disc, may be fed out to the IEEE1394 bus 11.

As described above, a data recording device of the present embodiment can easily replace the audio data which has been recorded on the hard disc drive 15 with the inputted analogue audio data while reproducing data recorded in the hard disc drive 15.

Furthermore, the data recording device of the present embodiment is configured so that data for 16 frames are processed in a lump when writing in/reading out are carried out with respect to the hard disc drive 15, and therefore, it is possible to carry out the processing effectively by reducing the number of times of data recording processing with respect to the hard disc drive 15.

Here, though the data recording device of the present embodiment processes the audio data for 16 frames in a lump, the unit of a lump of audio data may be any positive integer, which is not limited to the configuration of the present embodiment.

In Embodiment 2, in the case that the DV data are read out from the hard disc one frame at a time, the multi-DV data storage region in the buffer memory may be a smaller region than a region for 16 frames.

In another embodiment there is a case where the starting time point of post-recording is during the time while the audio data are being stored in the multi-audio data storage region (multi-audio block. The multi-audio block is formed for 16 frames) in the buffer memory of FIG. 9. For example, the post-recording is assumed to start from the fifth frame when being represented with the storage number to the multi-audio data storage region.

In this case, a new multi-audio block is generated from the A2 data read out from the disc from the first frame to the fourth frame of the multi-audio block, and from the post-recording data from the fifth frame to the last frame ($16^{th}$ frame).

This new multi-audio block and another signal (DV data and A1 data) may be multiplexed and be outputted.

Furthermore, this new multi-audio block is recorded in the multi-A2 data recording region on the hard disc wherein the original multi-audio block had been recorded by adding dummy data of 256 bytes.

In the same manner, there is a case where the end time point of post-recording is during the time while the audio data are being stored in an audio data storage region (multi-audio block) in the buffer memory of FIG. 5. For example, the post-recording is assumed to be ended at the tenth frame.

A new multi-audio block is generated from the post-recording data from the first multi-audio block to the tenth frame of the audio block, and from the A2 data read out from the disc from the eleventh frame to the last frame ($16^{th}$ frame) of the multi-audio block.

This new multi-audio block and another signal (DV data and A1 data) may be multiplexed and be outputted.

Furthermore, this new multi-audio block is recorded in the multi-A2 data recording region on the disc wherein the original multi-audio block had been recorded by adding dummy data of 256 bytes.

Embodiment 3

In the following, the third embodiment, which is one mode of a data recording device according to the present invention, is described in reference to FIGS. 11 to 15.

Figure 11:
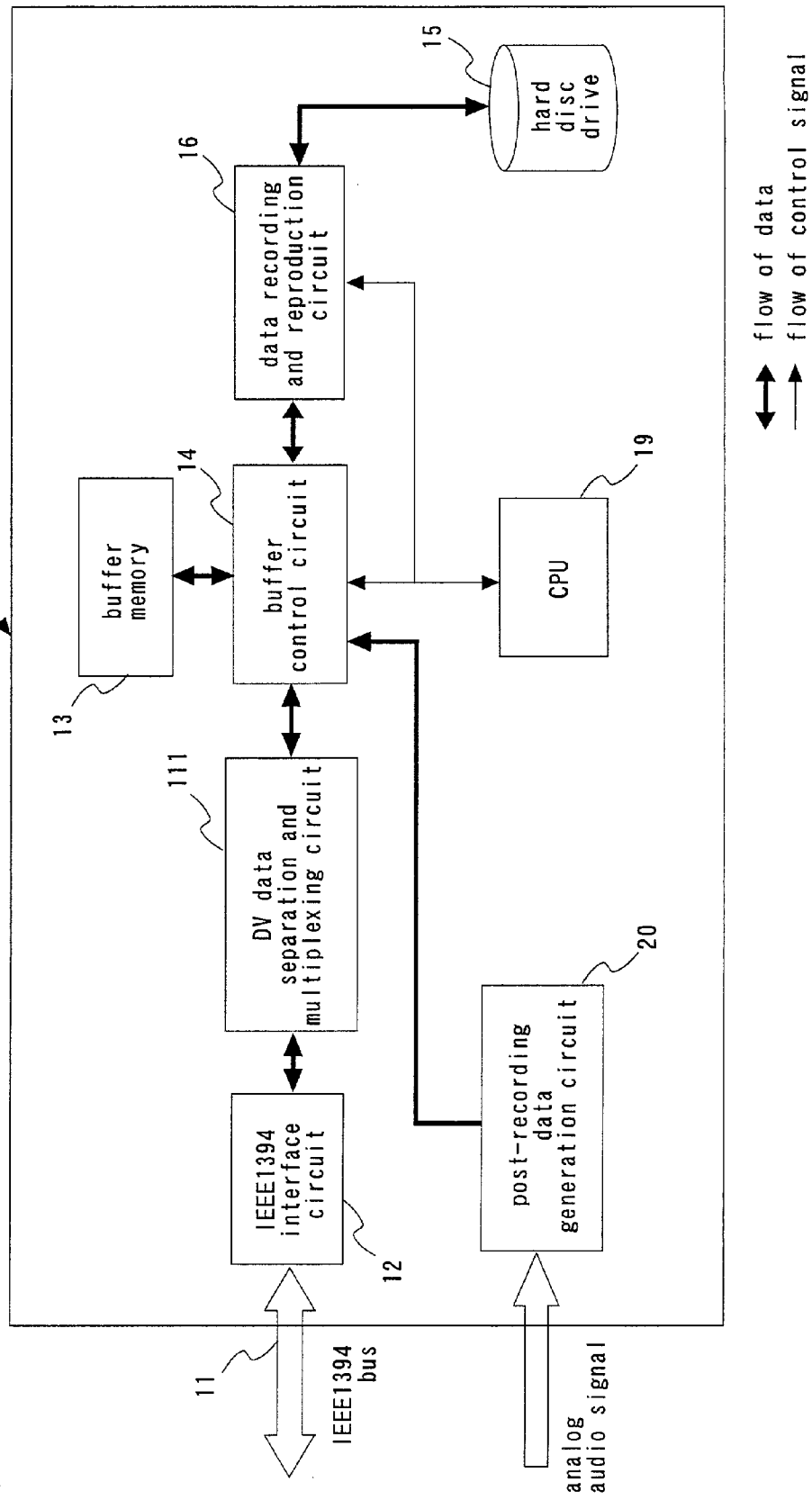
FIG. 11 is a block diagram of a data recording device in the third embodiment according to the present invention.

<Description of FIG. 11>

FIG. 11 is a block diagram showing the configuration of a data recording device according to the present invention.

In FIG. 11, the elements which have the same functions as in the data recording device (FIG. 1) in the first embodiment are denoted with the same numerals.

The present embodiment differs from the first embodiment in the point that a DV data separation and multiplexing circuit 111 is provided between the IEEE1394 interface circuit 12 and the buffer control circuit 14 so that the function (carried out by the CPU 19 through software) of the DV data separation and multiplexing block 17 in the first embodiment is carried out by a circuit (hardware).

The respective data recording regions are allocated in the hard disc drive 15 in the present embodiment in the same manner as in the first embodiment (see FIG. 4).

Figure 12:
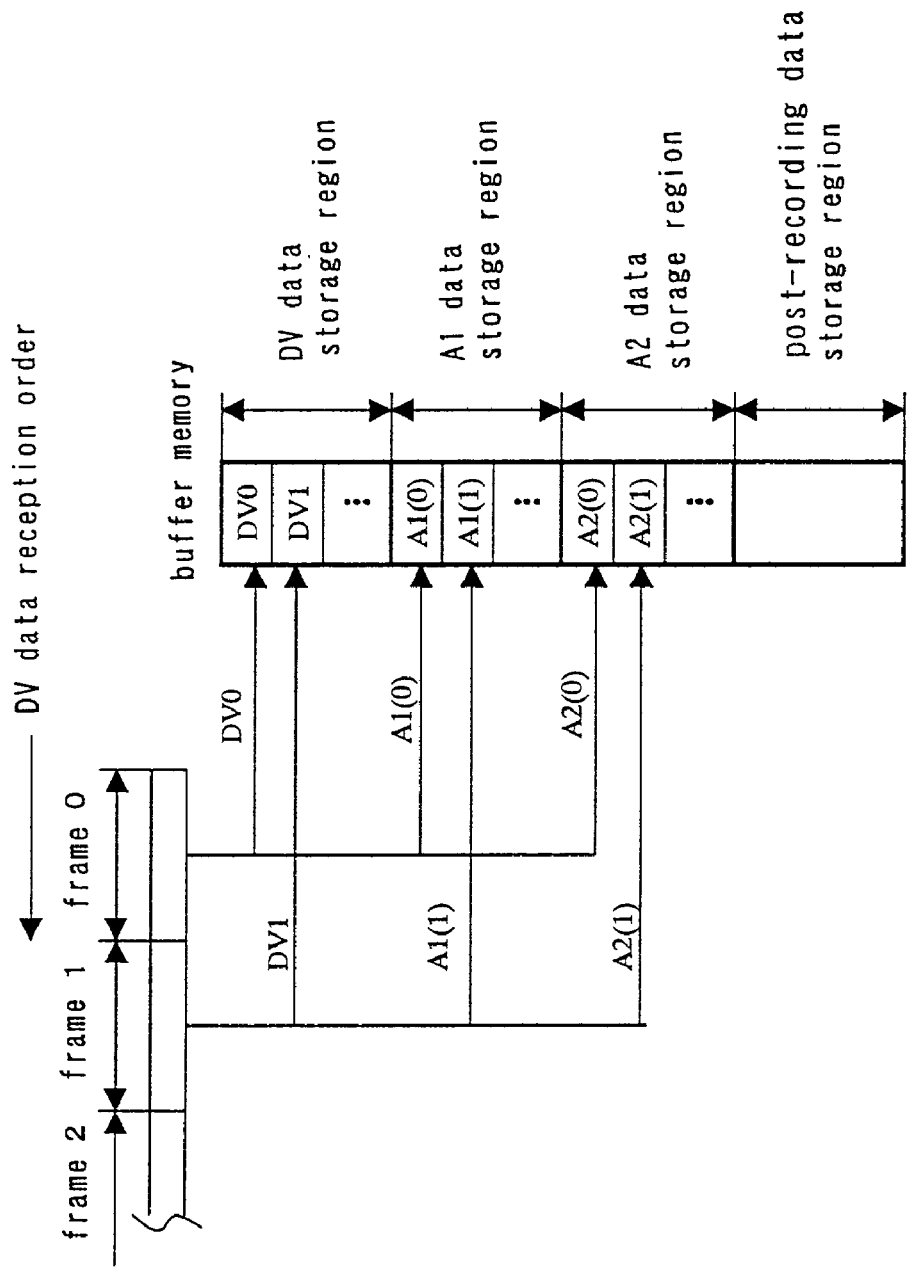
FIG. 12 is an illustrative diagram for describing a recording operation of a DV data separation and multiplexing circuit of the data recording device in the third embodiment according to the present invention.

<Description of FIG. 12>

Furthermore, as shown in FIG. 12, a DV data storage region, a A1 data storage region and a A2 data storage region are allocated in the buffer memory 13 for storing data read out respectively from a DV data recording region, a A1 data recording region and a A2 data recording region of the hard disc drive 15, in the present embodiment.

Storage regions for 16 frames are allocated in the DV data storage region, the A1 data storage region and the A2 data storage region respectively. Furthermore, an post-recording data storage region is allocated for 16 frames in the buffer memory in order to store the post-recording data.

The recording (REC) operation of the data recording device which is configured as described above is described.

The IEEE1394 interface circuit 12 carries out the same operation as in the first embodiment, and it receives DV data from the IEEE1394 bus and transmits DV data to the DV data separation and multiplexing circuit 111. The DV data separation and multiplexing circuit 111 transmits the DV data transmitted from the IEEE1394 interface circuit 12 to the buffer control circuit 14. Furthermore, the DV data separation and multiplexing circuit 111 extracts the A1 data and the A2 data respectively from among the DV data in the same manner as in the first embodiment, generates separate audio blocks, and transmits them to the buffer control circuit 14 respectively. A conceptual diagram is shown in FIG. 12. The buffer control circuit 14 records the DV data, the A1 data and the A2 data, which are transmitted from the DV data separation and multiplexing circuit 111, in respective data storage regions. The buffer control circuit 14 issues a frame storage notification to the data recording and reproduction control block 18 when it finishes the storage of the DV data, the A1 data and the A2 data in the buffer memory 13.

The data recording and reproduction control block 18 issues a transmission start request to the buffer control circuit 14 and the data recording and reproduction circuit 16 in accordance with the frame storage notification from the buffer control circuit 14, and records the DV data, the A1 data and the A2 data, which are stored in the buffer memory 13, on the hard disc drive 15 after adding dummy data. Each data is recorded from the leading address of the recording segment formed on the disc.

Through the above operation, data are recorded on the hard disc drive 15 as shown in FIG. 4 in the same manner as in the first embodiment.

Figure 13:
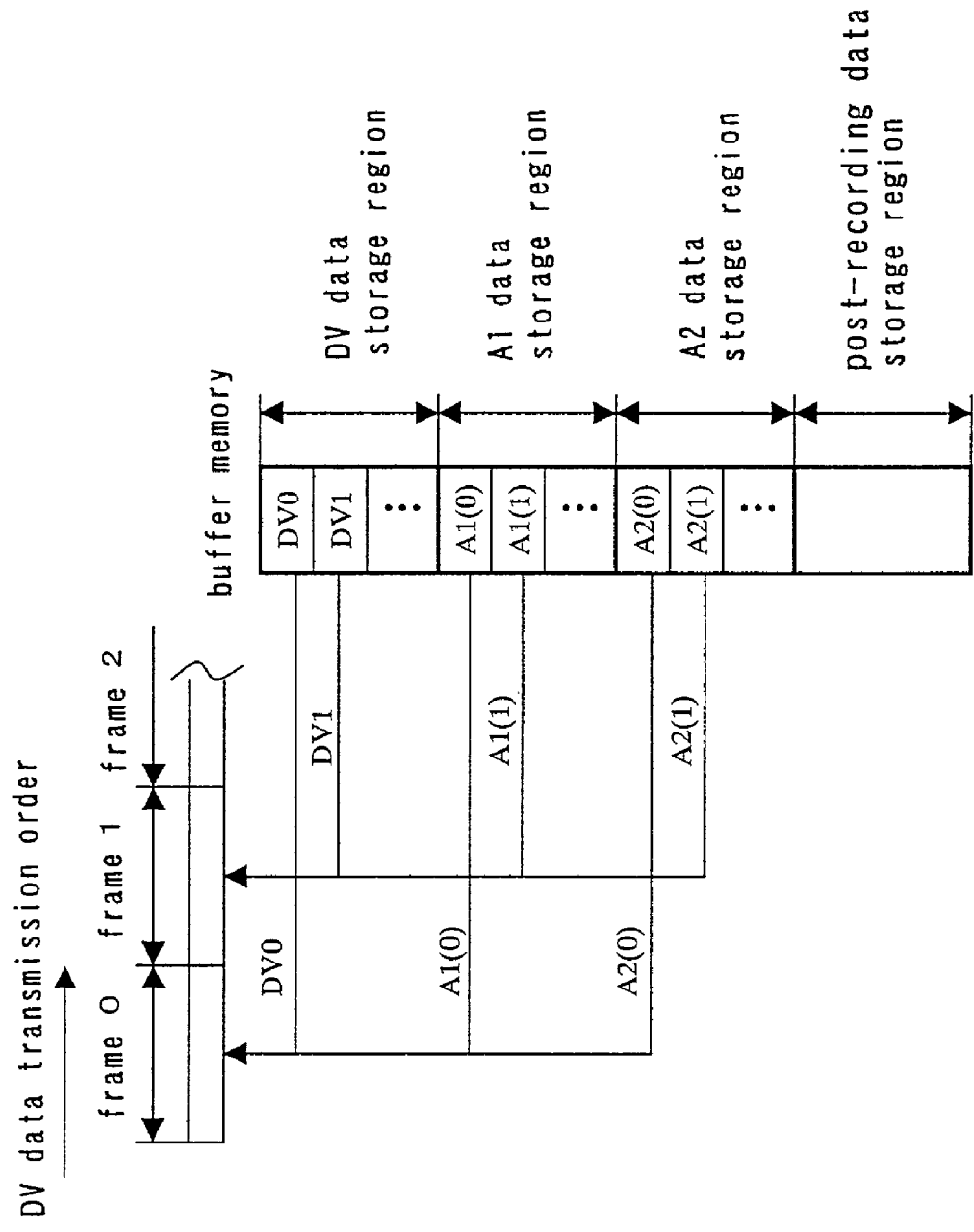
FIG. 13 is an illustrative diagram for describing a reproduction operation of a DV data separation and multiplexing circuit of the data recording device in the third embodiment according to the present invention.
Figure 14:
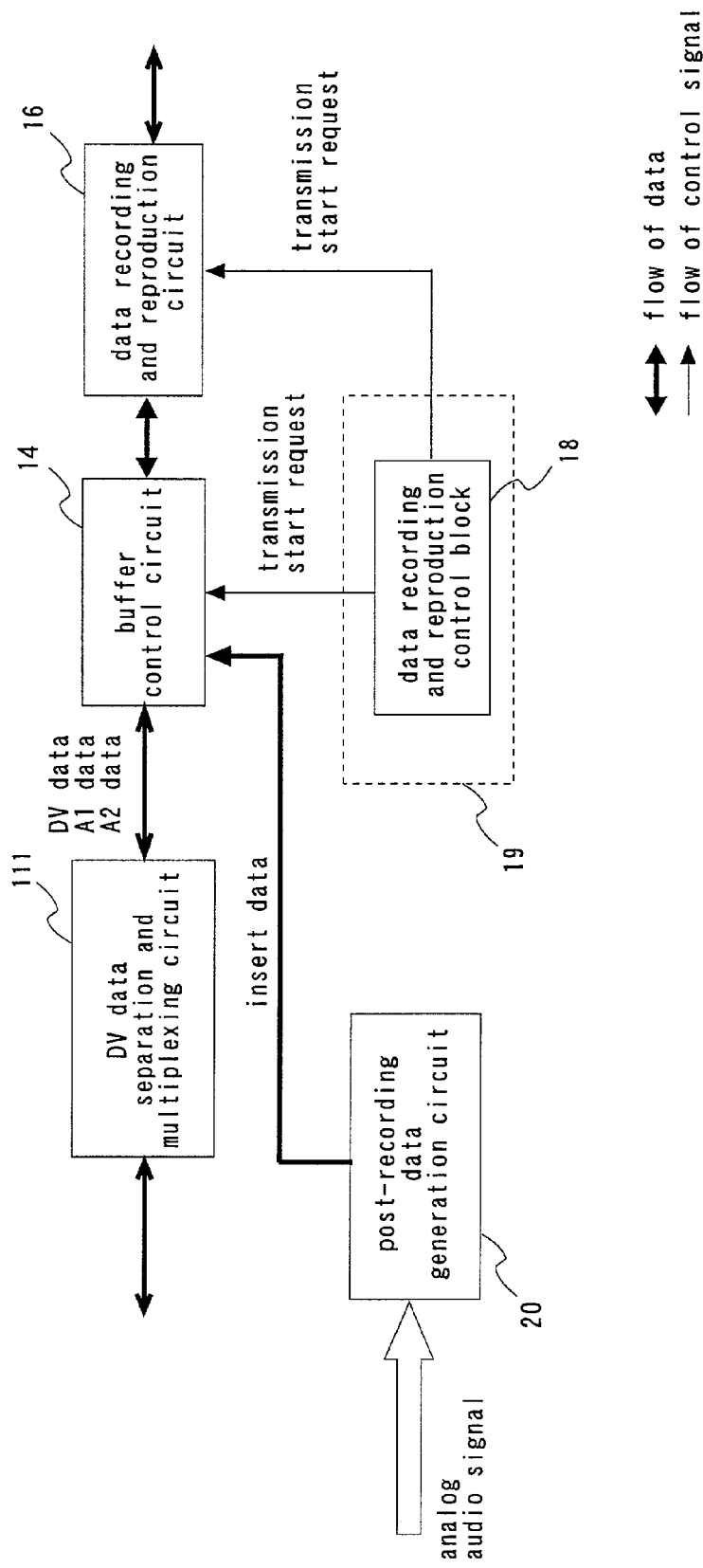
FIG. 14 is the first illustrative diagram for describing a reproduction operation and an audio editing operation of the data recording device in the third embodiment according to the present invention.

<Description of FIGS. 13 and 14>

Next, the reproduction operation of the case where the data recording device has received a reproduction request (PLAY) command from the outside is described. FIGS. 13 and 14 show illustrative diagrams for describing the operation of the data recording device.

The data recording and reproduction control block 18 controls the data recording and reproduction circuit 16 and the buffer control circuit 14 to read out the DV data to be reproduced for the first time in the frame unit from the hard disc drive 15, to store it in the lead of the DV data storage region after removing the dummy data. Next, the A1 data and the A2 data corresponding to the read out DV data are read out from the hard disc drive 15 and are stored in the leads of the A1 data storage region and the A2 data storage region on the buffer memory 13 after the dummy data are removed. Then, the data recording and reproduction control block 18 stores the DV data to be reproduced for the second time in the following region of the DV data storage region in the same manner. Furthermore, the A1 data and the A2 data corresponding to the read out DV data are read out in the same manner, and are stored in the following regions of the A1 data storage region and the A2 data storage region in sequence.

The DV data, the A1 data and the A2 data have the data length of the integer times of the recording segment on the disc and respective data are recorded from the leading address of the recording segment of the disc. And therefore, they can be written into and read out from the disc separately and independently.

The feeding of the DV data to the IEEE1394 bus 11 is started at the time point where predetermined numbers of the DV data, the corresponding A1 data and the corresponding A2 data are stored in the buffer memory 13 by repeating the above-described processing for a predetermined number of frames.

Figure 26:
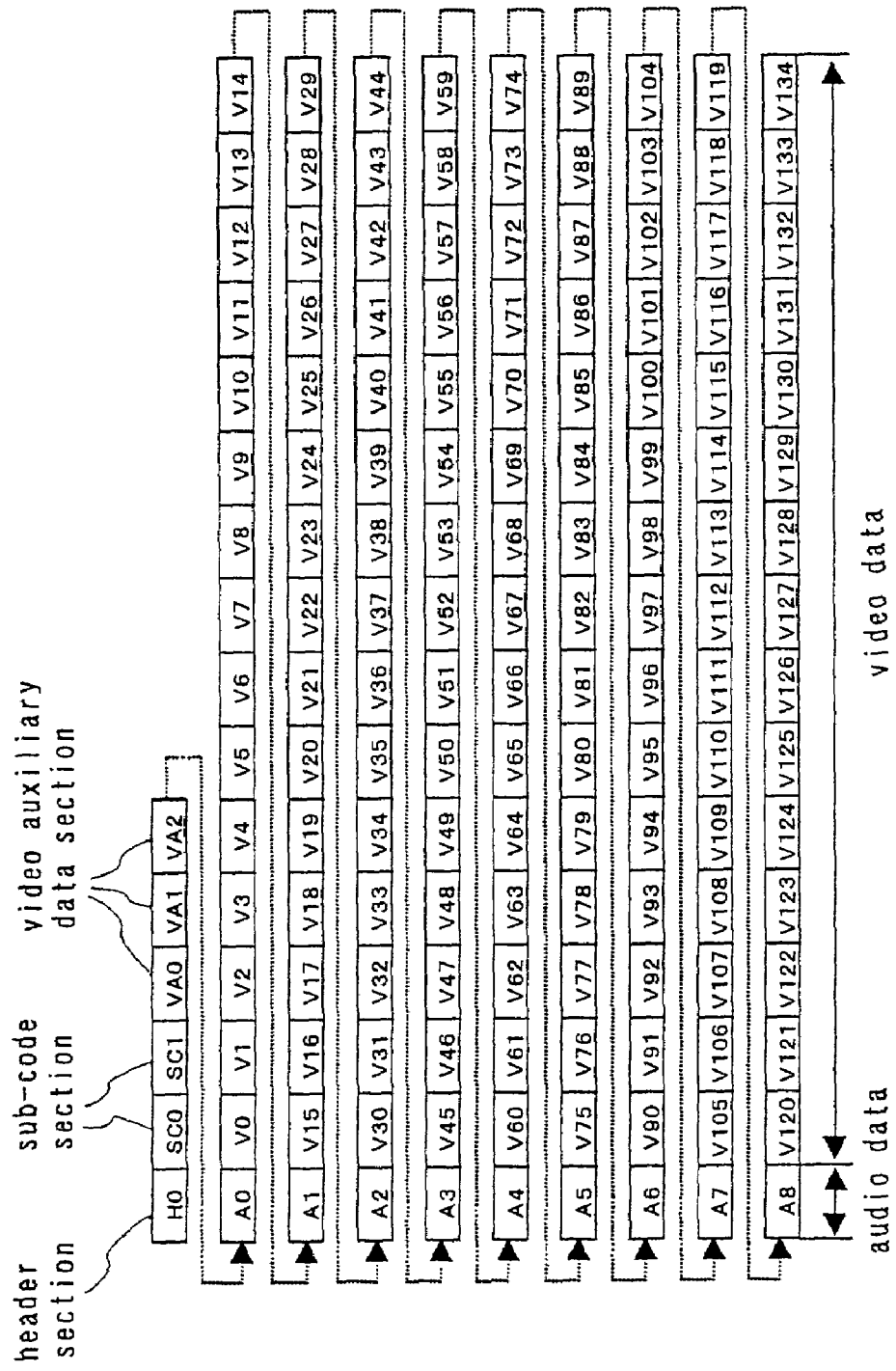
FIG. 26 is the second illustrative diagram for describing a data structure of a DV format.

The DV data separation and multiplexing circuit ill reads out the DV data (substantially the video data, attribute data and so on), the A1 data and the A2 data in sequence, generates the multiplexed DV data by replacing an audio data region in the DV data with the A1 data and the A2 data according to a predetermined timing, and feeds out that multiplexed DV data to the IEEE1394 interface circuit 12, together with the start of the feeding out of the multiplexed DV data. A conceptual diagram of the above-described multiplexing processing is shown in FIG. 13. More concretely, the DIF blocks of A0 to A8 in one DIF sequence as shown in FIG. 26 are replaced with the A1 data or the A2 data. As for the former half of the DIF sequences (0 to 4) in the ten DIF sequences included in the data for one frame, the DIF blocks of A0 to A8 are replaced with the A1 data. As for the latter half of the DIF sequences (5 to 9), the DIF blocks of A0 to A8 are replaced with the A2 data.

After that, the data is read out from the hard disc drive 15, and the DV data are fed out to the IEEE1394 bus 11 in sequence at the time when the frame number of the DV data which haven't yet been fed out on the buffer memory 13 becomes smaller than a predetermined number.

As described above, the data recording device of the present embodiment reproduces and feeds out the multiplexed DV data onto the IEEE1394 bus 11 while multiplexing the DV data, the A1 data and the A2 data which are recorded in separate regions on the hard disc drive 15 by the DV data separation and multiplexing circuit 111.

Figure 15:
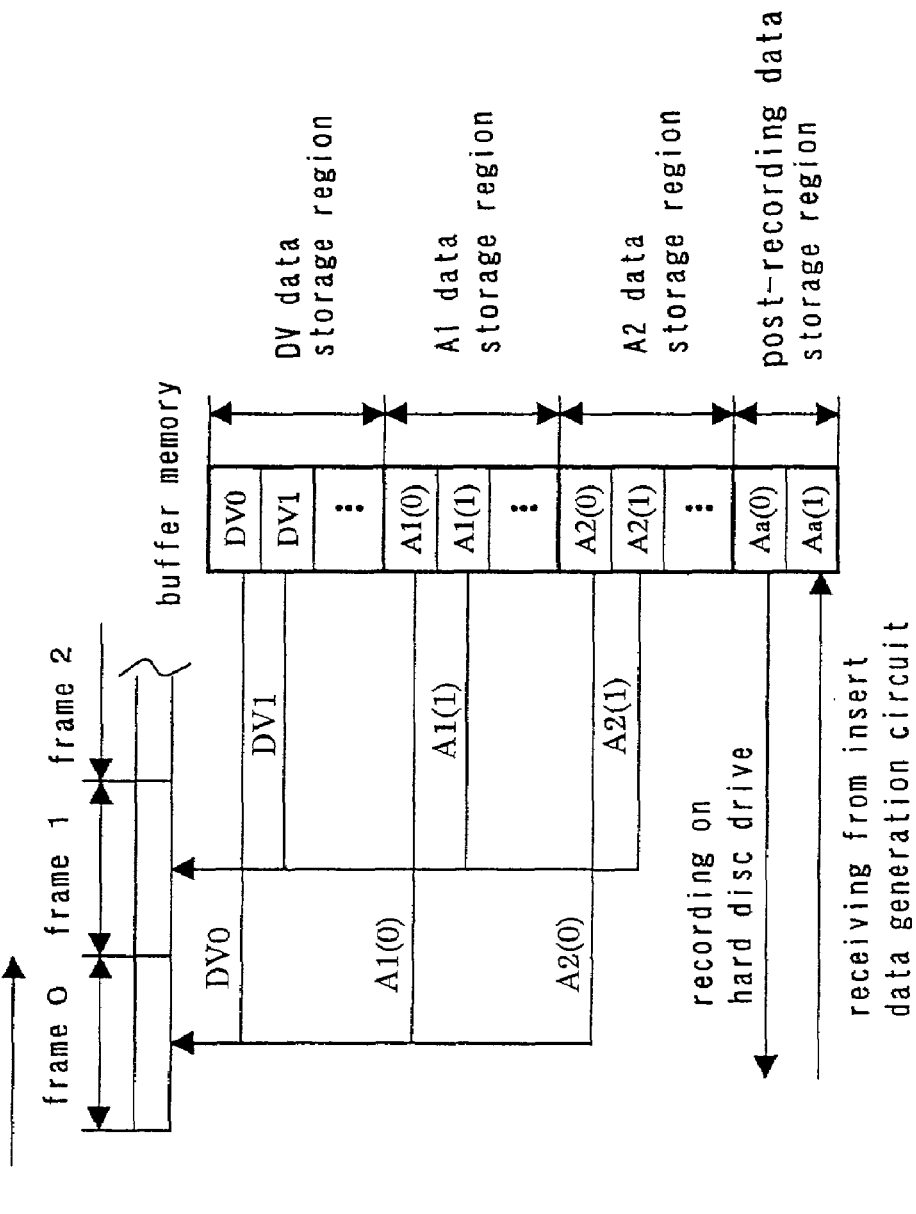
FIG. 15 is the second illustrative diagram for describing an audio editing operation of the data recording device in the third embodiment according to the present invention.

<Description of FIG. 15>

Next, the audio editing operation of the case where the data recording device has received an audio editing request from the outside is described.

The data recording device in the present embodiment can convert the inputted analogue audio signal into the post-recording data in a DV format, and can record it in a predetermined audio data recording region of the hard disc drive 15 while carrying out the above-described reproduction processing.

First, DV data (substantially the video data and so on), A1 data and A2 data are read out in sequence, and are stored in the respective storage regions in the buffer memory 13 after the dummy data are removed, in the same manner as in the PLAY operation. When a predetermined number of the DV data (substantially the video data and so on), the A1 data and the A2 data are stored in the buffer memory 13, the multiplexed DV data starts to be fed out to the IEEE1394 bus 11. This operation is the same as the above-described reproduction processing.

When the user presses the post-recording button, the post-recording data generation circuit 20 starts converting the received analogue audio signal into post-recording data and transmitting it to the buffer control circuit 14 in sequence in synchronization with the start of the feeding out of the multiplexed DV data to the IEEE1394 bus 11.

The buffer control circuit 14 stores the post-recording data transmitted from the post-recording data generation circuit 20 in the post-recording data storage region (Aa) in the buffer memory 13. The buffer control circuit 14 makes notification of completion of storage of the post-recording data to the data recording and reproduction control block 18 at the time when post-recording data for one frame has been stored in the buffer memory 13.

The data recording and reproduction control block 18 controls the buffer control circuit 14 and the data recording and reproduction circuit 16 to record the post-recording data, of the post-recording data storage region Aa (0) in the post-recording data storage region (Aa), in the A2 data recording region of the hard disc drive 15 after adding the dummy data of 496 bytes. The post-recording data are recorded from the leading address of the recording segment on the disc. At this time, the post-recording data generated by the post-recording data generation circuit 20 during the recording of the post-recording data are stored in the post-recording data storage region Aa (1) in sequence.

Two post-recording data storage regions Aa (0) and Aa (1) carry out writing in and reading out alternately. That is to say, when the post-recording data inputted from the outside are being written into the post-recording data storage region Aa (0), the data read out from the post-recording data storage region Aa (1) are written into the A2 data recording region on the hard disc after adding dummy data. Furthermore, the data read out from the post-recording data storage region Aa (1) may be multiplexed with another signal (DV data and A1 data) and may be outputted.

When the post-recording data inputted from the outside are being written into the post-recording data storage region Aa (1), the data read out from the post-recording data storage region Aa (0) are written into the A2 data recording region on the hard disc after adding dummy data. Furthermore, the data read out from the post-recording data storage region Aa (0) may be multiplexed with another signal (DV data and A1 data) and may be outputted.

A conceptual diagram showing data flow to the above buffer memory 13 is shown in FIG. 15.

It is possible to record new audio data in the A2 data recording region on the hard disc drive 15 through the above processing. In this manner, the DV data, got by multiplexing the DV data (substantially the video data and so on) which has been recorded in the DV data recording region on the hard disc drive 15 with the A1 data which has been recorded in the A1 data recording region and the newly inserted and recorded post-recording data (recorded in the A2 data recording region), can be fed out to the IEEE1394 bus 11.

As described above, the data recording device of the present embodiment makes it possible to easily replace the audio data recorded on the hard disc drive 15 with the audio data inputted later in an analogue manner while reproducing the data recorded on the hard disc drive 15.

Embodiment 4

In the following, the fourth embodiment which is one mode of a data recording device according to the present invention is described in reference to FIGS. 16 to 23.

Figure 16:
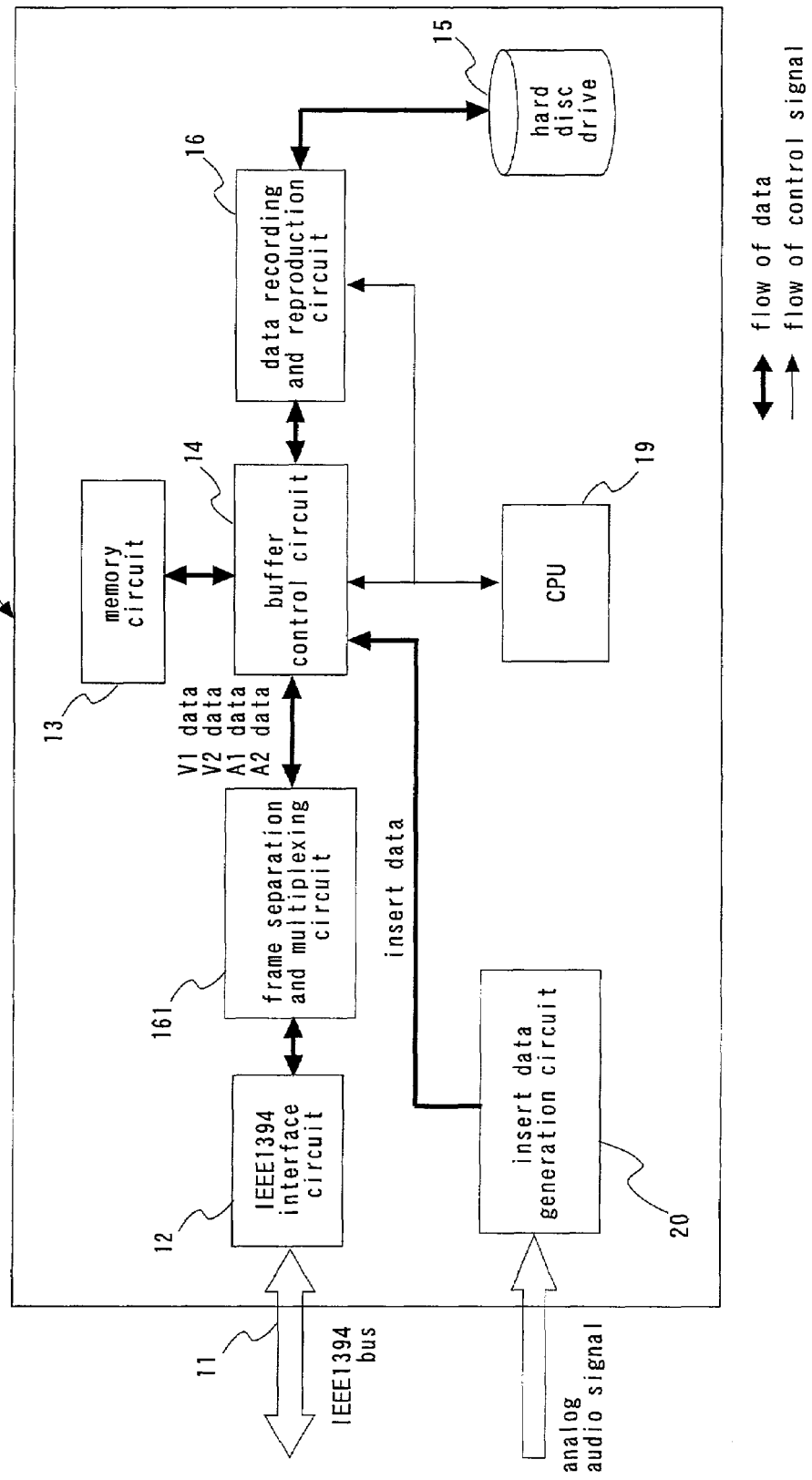
FIG. 16 is a block diagram of a data recording device in the fourth embodiment according to the present invention.

<Description of FIG. 16>

FIG. 16 is a block diagram showing the configuration of a data recording device according to the present invention. In FIG. 16 the elements which have the same functions as in the data recording device (FIG. 11) in the third embodiment are denoted by the same numerals.

The data recording device of the present embodiment inputs the multiplexed DV data which includes plural video signals in one frame of data.

The data recording device of the present embodiment differs from the third embodiment in the point that a frame separation and multiplexing circuit 161 is provided between the IEEE1394 interface circuit 12 and the buffer control circuit 14.

Figure 17:
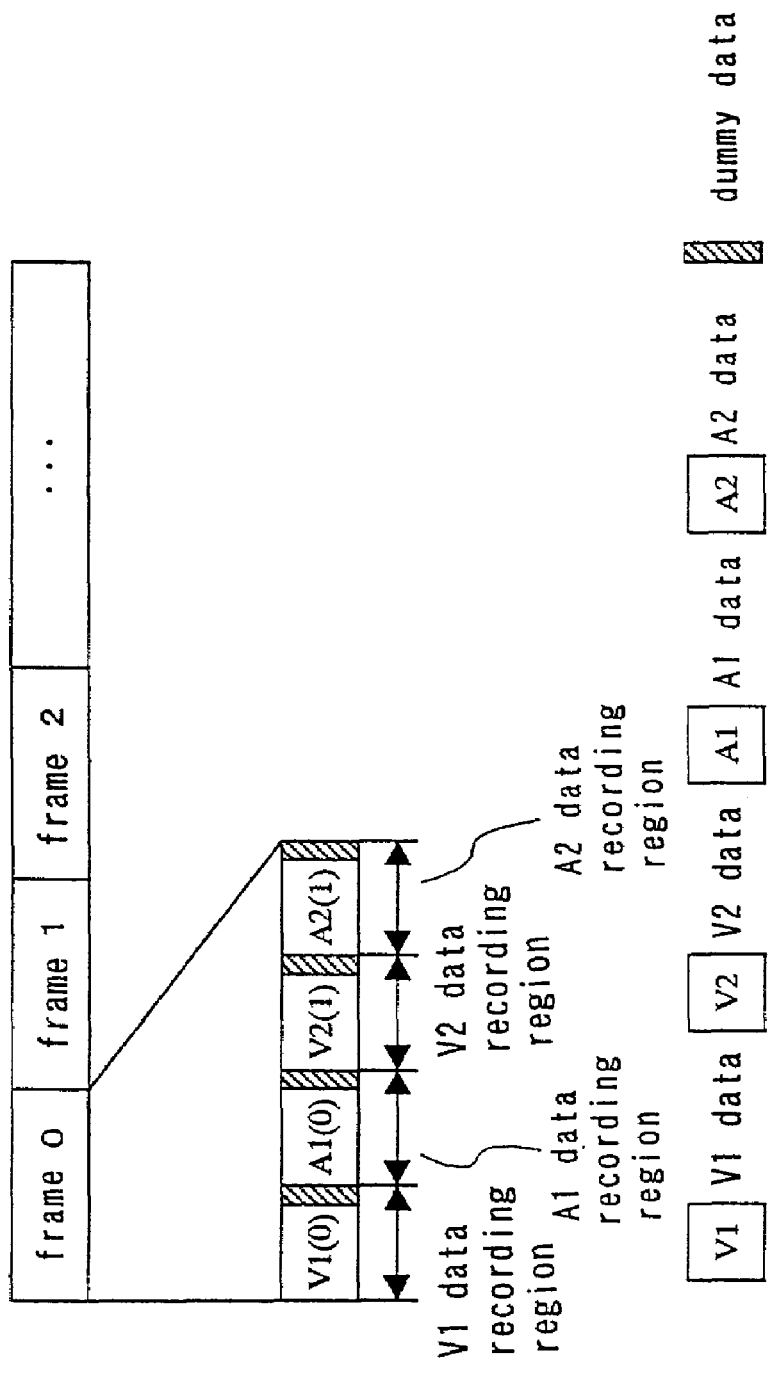
FIG. 17 is a layout diagram of a data recording region on a hard disc drive in the fourth embodiment according to the present invention.

<Description of FIG. 17>

A DV frame recording region for recording DV data in the frame unit is allocated in the hard disc drive 15 in the present embodiment as shown in FIG. 17.

FIG. 17 illustrates the case where the data recording device of the present embodiment inputs a multiplexed signal which includes two video signals in one frame of data. However, the number of multiplexed video signals is not limited to two. The data recording device of the present embodiment carries out allocation of the DV frame recording regions in accordance with the number of video signals included in the DV data.

A V1 data recording region is a region which records the first video signal included in the frame.

An A1 data recording region is a region which records the first stereo audio signal included in the frame. In general, the first video signal and the first audio signal make up one program.

A V2 data recording region is a region which records the second video signal included in the frame.

An A2 data recording region is a region which records the second stereo audio signal included in the frame. In general, the second video signal and the second audio signal make up another program.

The leading address of each recording region is managed to agree with the leading address of the sector.

Figure 18:
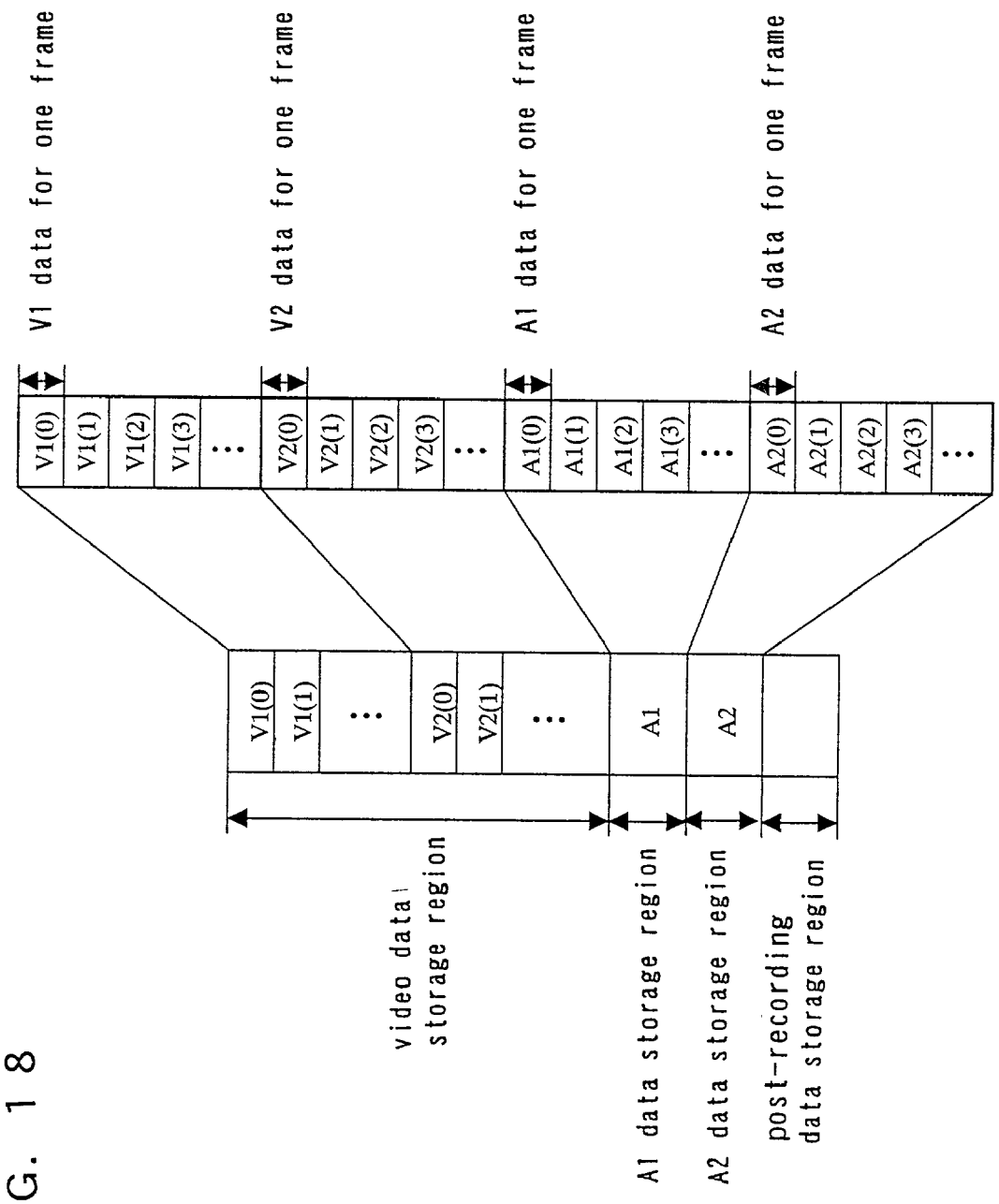
FIG. 18 is a layout diagram of a data storage region on a buffer memory of the data recording device in the fourth embodiment according to the present invention.

<Description of FIG. 18>

The buffer memory 13 of the present embodiment has the data storage regions which correspond to respective data recording regions on the hard disc drive 15 and which are used at the time of recording and at the time of reproduction, as shown in FIG. 18.

A V1 data storage region is allocated in the buffer memory 13 corresponding to the V1 data recording region (first video data) on the hard disc drive 15. In the same manner, in the buffer memory 13, a V2 data storage region is allocated corresponding to the V2 data recording region (second video data), an A1 data storage region is allocated corresponding to the A1 data recording region (first audio data) and an A2 data storage region is allocated corresponding to the A2 data recording region (second audio data). Furthermore, an post-recording data storage region for storing post-recording data is allocated in the buffer memory 13 at the time of audio editing which will be described later.

Figure 19:
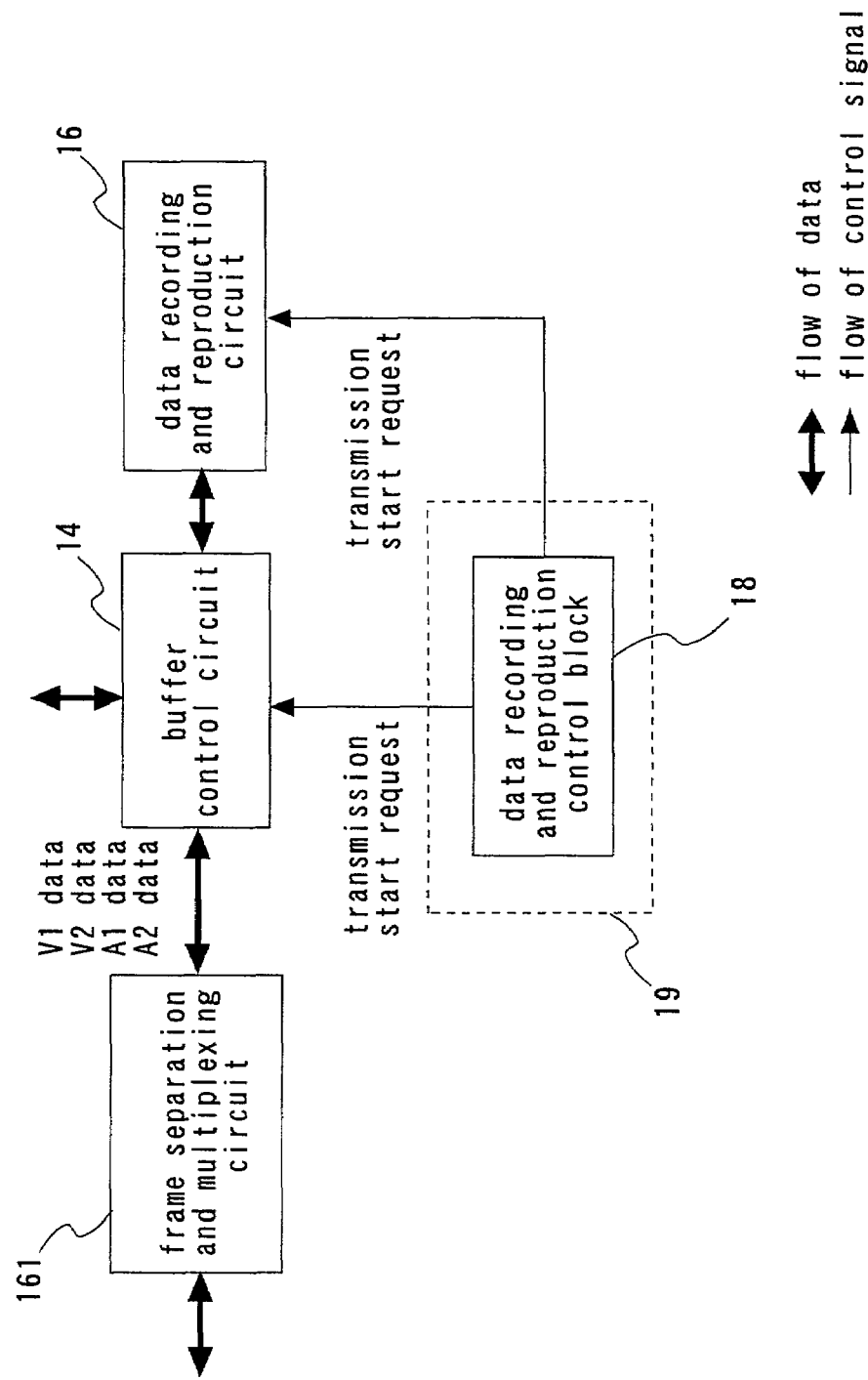
FIG. 19 is an illustrative diagram for describing a recording operation of the data recording device in the fourth embodiment according to the present invention.

<Description of FIG. 19>

In the following, the recording operation of the data recording device of the present embodiment is described in reference to FIGS. 16 to 23.

The IEEE1394 interface circuit 12 carries out the same operation as in the first embodiment, receives the DV data transmitted through the IEEE1394 bus and transmit it to the frame separation and multiplexing circuit 161.

Figure 25:
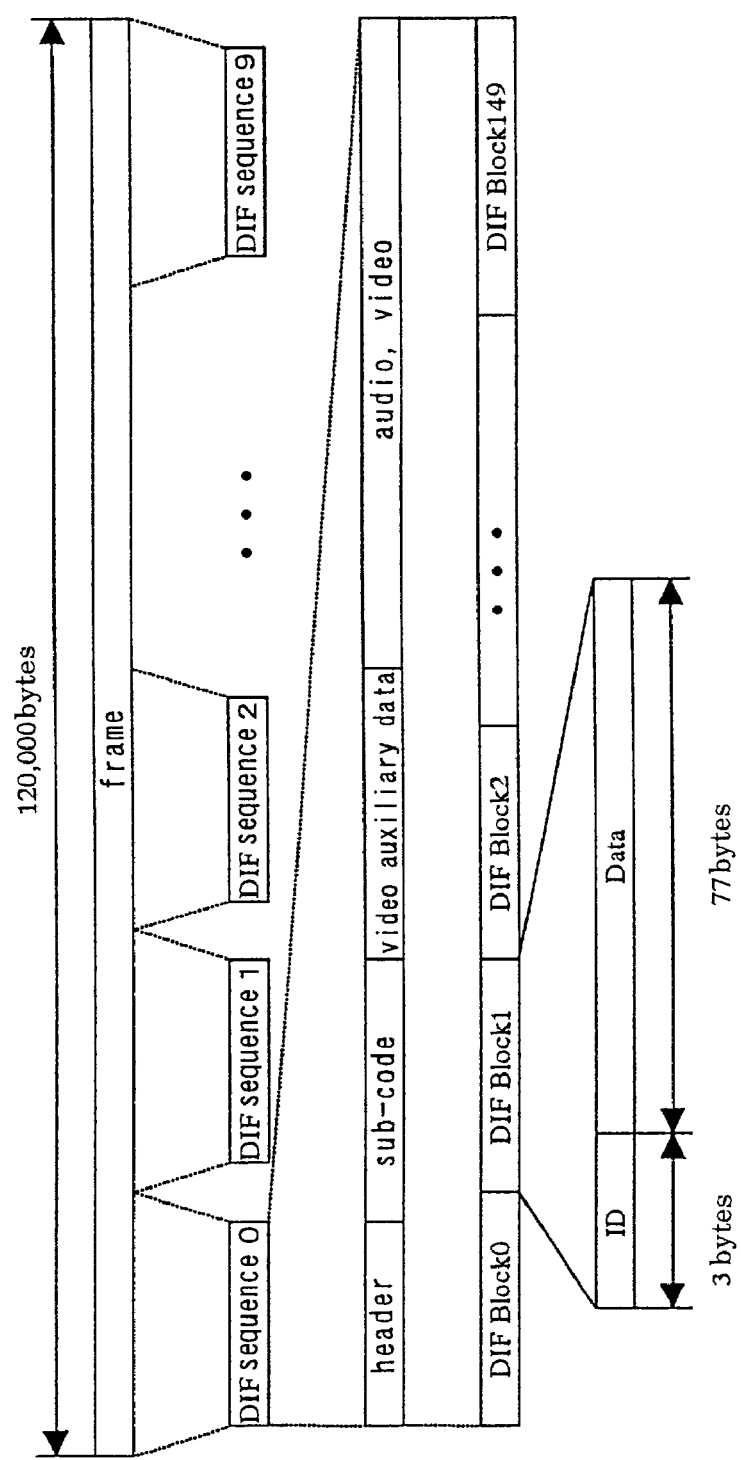
FIG. 25 is the first illustrative diagram for describing a data structure of a DV format.

The frame separation and multiplexing circuit 161 separates the first video data (including attribute data and so on) and the first stereo audio data from the former half of the DIF sequences (0 to 4) in the DV data for one frame (formed of 10 DIF sequences (FIG. 25)) transmitted from the IEEE1394 interface circuit 12. In the same manner, it separates the second video data (including attribute data and so on) and the second stereo audio data from the latter half of the DIF sequences (5 to 9). The arrangement of the video data and the audio data is the same as in FIG. 26. The separated first video data (V1 data), the first stereo audio data (A1 data), the second video data (V2 data) and the second stereo audio data (A2 data) are transmitted to the buffer control circuit 14.

Figure 22:
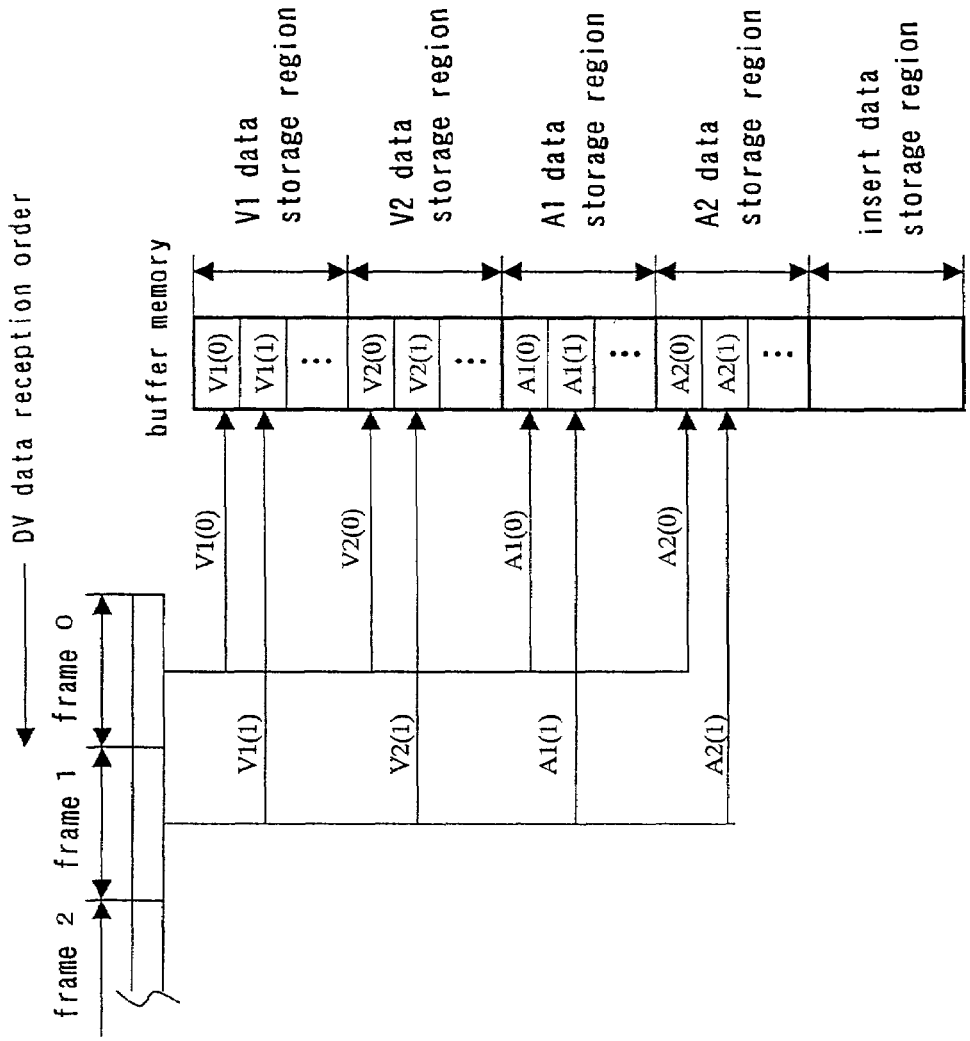
FIG. 22 is an illustrative diagram for describing a recording operation of the data recording device in the fourth embodiment according to the present invention.

<Description of FIG. 22>

The buffer control circuit 14 records the V1 data, the V2 data, the A1 data and the A2 data transmitted from the frame separation and multiplexing circuit 161 respectively in the corresponding data storage regions in the buffer.

FIG. 22 shows the manner of storage of each data in each data storage region in the buffer memory.

The buffer control circuit 14 issues a frame storage notification to the data recording and reproduction control block 18 after finishing the storage of the V1 data, the V2 data, the A1 data and the A2 data in the buffer memory 13.

The data recording and reproduction control block 18 issues a transmission start request to the buffer control circuit 14 and the data recording and reproduction circuit 16 in accordance with the frame storage notification from the buffer control circuit 14, and records the V1 data, the V2 data, the A1 data and the A2 data, stored in the buffer memory 13, respectively in corresponding data recording regions on the hard disc drive 15.

<Description of FIG. 20>

The V1 data is data (56,400 bytes) which is got by removing an audio signal (3,600 bytes) from the five DIF sequences (60,000 bytes).

The data recording and reproduction circuit 16 adds dummy data (432 bytes) to the V1 data transmitted from the buffer control circuit 14 so as to be converted to a block which agrees with the integer times of the recording segment (sector: 512 bytes) on the hard disc, and records the V1 data in the V1 data recording region on the hard disc drive 15 (FIG. 20).

The V2 data, after dummy data (432 bytes) has been added, is recorded in the V2 data recording region on the hard disc drive 15 in the same manner.

The A1 data and the A2 data, after dummy data of 496 bytes have been added respectively, are recorded in respective data recording regions of the hard disc drive (see FIG. 17) in the same manner as in the first embodiment.

The V1 data, the V2 data, the A1 data and the A2 data are recorded respectively from the leading address of the recording segment formed on the disc.

Through the above-described operation, the data are recorded on the hard disc drive 15 as shown in FIG. 17.

Next, the audio editing operation of the case where the data recording device has received an audio editing request from the outside is described.

Figure 21:
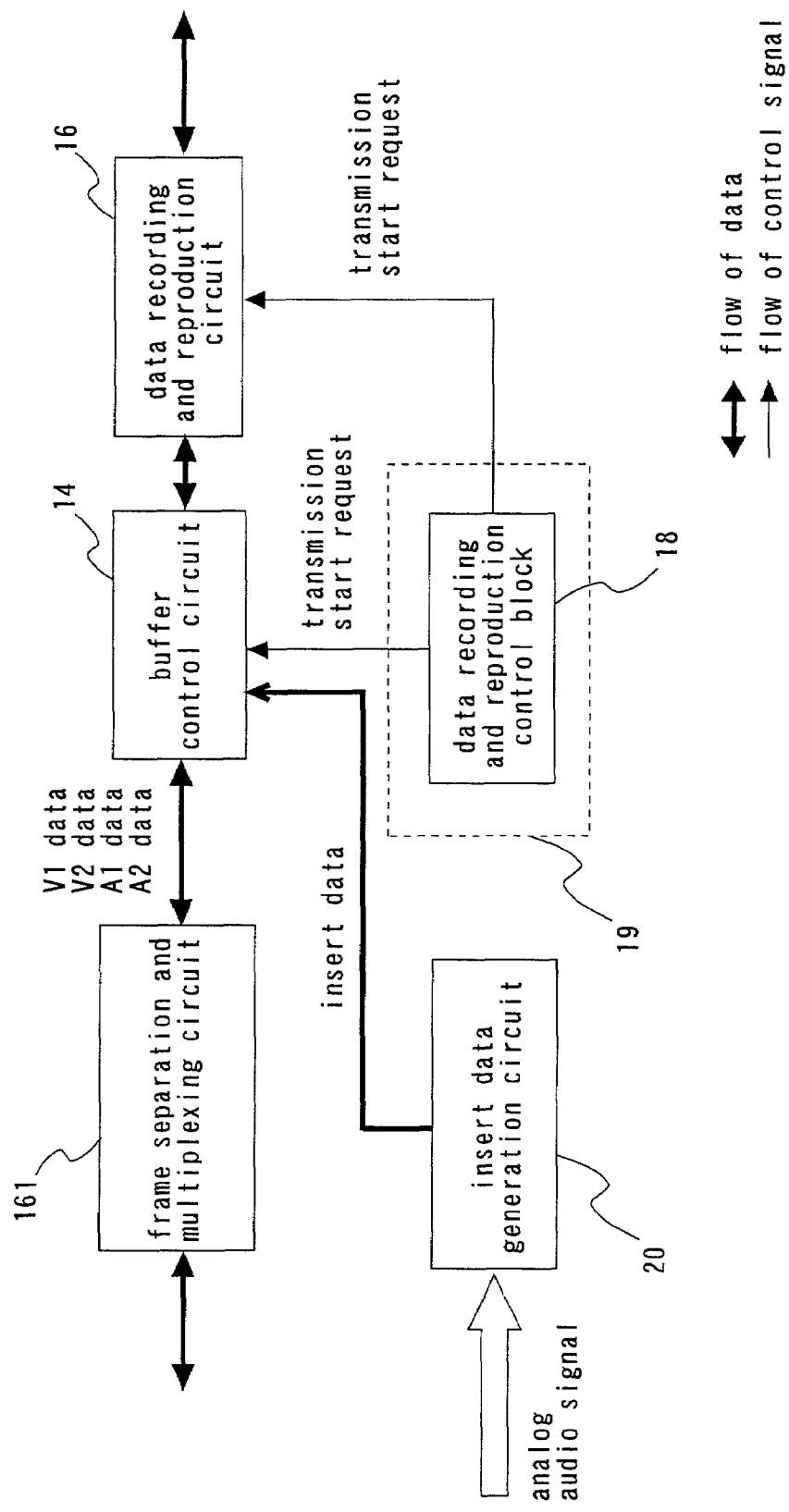
FIG. 21 is an illustrative diagram for describing a reproduction operation and an audio editing operation of the data recording device in the fourth embodiment according to the present invention.
Figure 23:
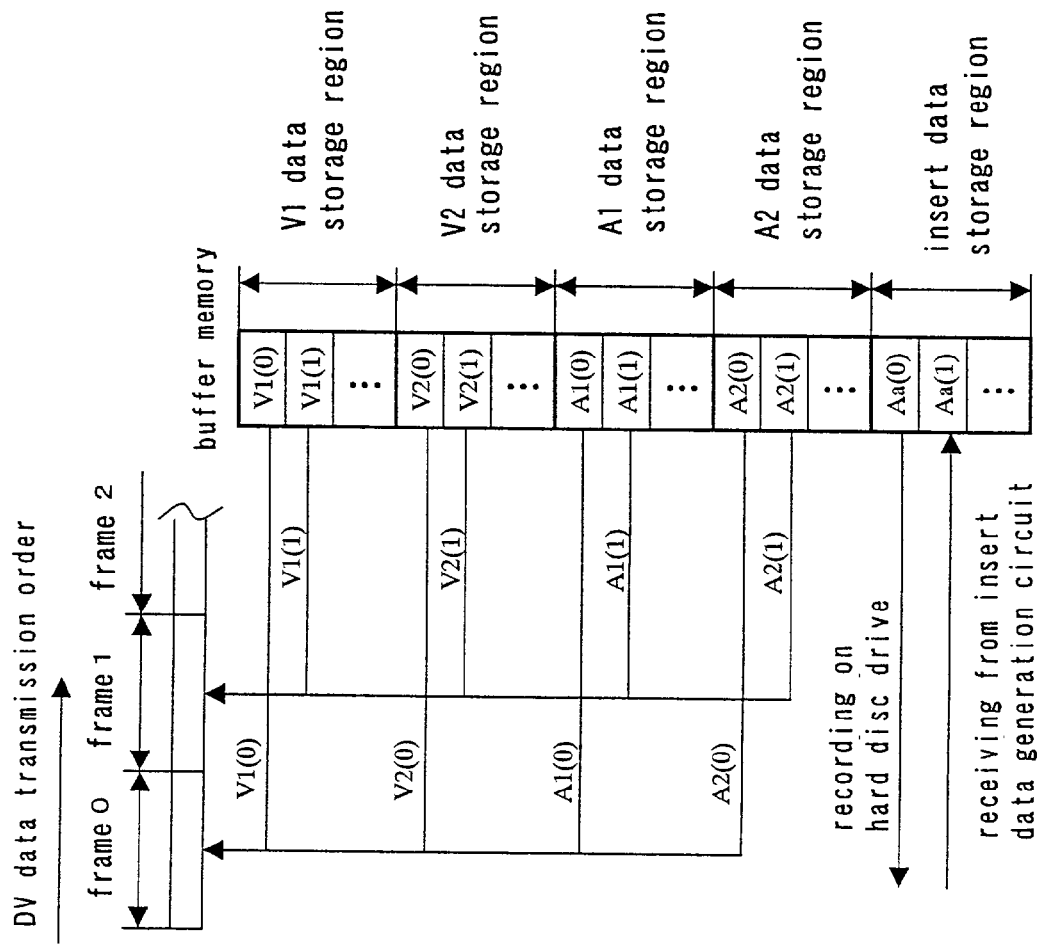
FIG. 23 is an illustrative diagram for describing an audio editing operation of the data recording device in the fourth embodiment according to the present invention.

<Description of FIGS. 21 and 23>

The data recording device in the present embodiment can convert the inputted analogue audio signal into post-recording data in a DV format and can record this data in a predetermined audio data recording region on the hard disc drive 15 while carrying out the above-described reproduction processing.

In the PLAY operation, the V1 data, the V2 data, the A1 data and the A2 data are read out from the hard disc drive 15 in sequence and are stored in respective storage regions in the buffer memory 13 after the dummy data are removed. When predetermined number of the V1 data, the V2 data, the A1 data and the A2 data are stored in the buffer memory 13, the buffer control circuit 14 reads out the V1 data, the V2 data, the A1 data and the A2 data for one frame from respective data storage regions of the buffer memory 13, transmits them to the frame separation and multiplexing circuit (video and audio separation and multiplexing circuit) 161. The frame separation and multiplexing circuit 161 writes in the V1 data, the V2 data, the A1 data and the A2 data for one inputted frame in an internal memory. The frame separation and multiplexing circuit 161 generates DV data storage regions separately in an internal memory and stores the above-described V1 data, V2 data, A1 data and A2 data respectively in predetermined positions of the above DV data storage region. The feeding out of multiplexed DV data to the IEEE1394 bus 11 is started.

The V1 data, the V2 data, the A1 data and the A2 data can be written into and can be read out from the disc separately and independently because respective data have the data length of the integer times of the recording segment on the disc and are recorded from the leading address of the recording segment on the disc.

When the user presses the post-recording button the post-recording data generation circuit (insert data generation circuit) 20 starts converting the received analogue audio signal into post-recording data and transmitting it to the buffer control circuit 14 in sequence in synchronization with the start of the feeding out of the multiplexed DV data to the IEEE1394 bus 11.

The buffer control circuit 14 stores the post-recording data transmitted from the post-recording data generation circuit 20 in the post-recording data storage region (Aa) in the buffer memory 13. The buffer control circuit 14 makes notification of completion of storage of the post-recording data to the data recording and reproduction control block 18 at the time when the post-recording data for one frame has been stored in the buffer memory 13.

The data recording and reproduction control block 18 controls the buffer control circuit 14 and the data recording and reproduction circuit 16 to add dummy data of 496 bytes to the post-recording data of the data storage region Aa (0) in the post-recording data storage region (Aa), and records this post-recording data, to which the dummy data is added, in the A2 data recording region of the hard disc drive 15 in accordance with the post-recording data storage notification from the buffer control circuit 14. This post-recording data is recorded from the leading address of the recording segment formed on the disc. It can be recorded in the A1 data recording region according to user's selection. At this time, the post-recording data generated by the post-recording data generation circuit 20 during the recording of the post-recording data is stored in the post-recording data storage region Aa (1) in sequence.

The two post-recording data storage regions Aa (0) and Aa (1) alternately carry out writing in and reading out. That is to say, at the time when the post-recording data inputted from the outside is being written into the post-recording data storage region Aa (0), the data read out from the post-recording data storage region Aa (1) is written into the A2 data recording region on the hard disc after dummy data has been added. Furthermore, the data read out from the post-recording data storage region Aa (1) is multiplexed with another signal (V1 data, V2 data and A1 data) and is outputted.

At the time when the post-recording data inputted from the outside is being written into the post-recording data storage region Aa (1), the data read out from the post-recording data storage region Aa (0) is written into the A2 data recording region on the hard disc after dummy data has been added. Furthermore, the data read out from the post-recording data storage region Aa (0) is multiplexed with another signal (V1 data, V2 data and A1 data) and is outputted.

It is possible to record new audio data in the A2 data recording region (or the A1 data recording region according to user's selection) on the hard disc drive 15 through the above-described processing. In this manner, the DV data, got by multiplexing the V1 data which has been recorded in the V1 data recording region, the V2 data which has been recorded in the V2 data recording region, the A1 data which has been recorded in the A1 data recording region on the hard disc drive 15, and the newly inserted and recorded post-recording data (recorded in the A2 data recording region), can be fed out to the IEEE1394 bus 11.

In another embodiment, the post-recording of an audio signal is not carried out, but a video signal and an audio signal (for example, V2 data and A2 data) are edited by insert editing. For example, V1 data and A1 data are assumed to be of a music program while V2 data and A2 data are assumed to be of a sports program.

In this case, the above-described futuristic DV format, which includes plural video signals in one frame, is assumed. However, the object to which the present invention is applied is not limited to the DV format and it can be applied to an arbitrary format which includes plural video signals in one frame.

In this example, in FIG. 16, another video signal and another audio signal, instead of the inputted analogue audio signal for post-recording, are inputted. This video signal and this audio signal may be analogue signals or may be digital signals. Furthermore, the video signal and the audio signal which are digital signals may be separate and independent signals or may be a multiplexed signal. Furthermore, they may be a video signal and an audio signal which are included in another DV signal inputted from the IEEE1394 bus 11.

When the user presses the insert editing button, the insert data generation circuit 20 converts the received video signal and the audio signal into a video signal and an audio signal which can be multiplexed into DV data, and transmits the converted video signal and the converted audio signal to the buffer control circuit 14 in sequence in synchronization with the start of the feeding out of the multiplexed DV data to the IEEE1394 bus 11.

The buffer control circuit 14 stores the video signal and the audio signal, transmitted from the insert data generation circuit 20, in the insert data storage region (V1 data storage region and A1 data storage region) in the buffer memory 13.

The post-recording data storage region (insert data storage region) in FIGS. 18, 22 and 23 are changed to the insert data storage region in the present embodiment. The insert data storage region is divided into a V1 data storage region for storing the video data for insertion and an A1 data storage region for storing the audio data for insertion. The V1 data storage region is formed of two storage regions, V1 (1) and V1 (2) which can store the video data for one frame respectively. The A1 data storage region is formed of two storage regions, A1 (1) and A1 (2) which can store the audio data for one frame respectively.

The buffer control circuit 14 makes notification of completion of storage of the data for insertion to the data recording and reproduction control block 18 at the time when the video data and the audio data for one frame are stored in the buffer memory 13.

The data recording and reproduction control block 18 controls the buffer control circuit 14 and the data recording and reproduction circuit 16, in accordance with the storage notification of data for insertion from the buffer control circuit 14, to record the video data for insertion, read out from the V1 data storage region, in the V2 data recording region of the hard disc drive 15 after the addition of dummy data of 432 bytes. The video data for insertion is recorded from the leading address of the recording segment of the hard disc. In the same manner, the audio data for insertion, read out from the A1 data storage region, is recorded in the A2 data recording region of the hard disc drive 15 after the addition of dummy data of 496 bytes. The audio data for insertion is recorded from the leading address of the recording segment on the hard disc. Alternatively, according to selection by the user, the data can be recorded in the V1 data recording region and the A1 data recording region of the hard disc drive 15.

V1 (1) and A1 (1) as well as V1 (2) and A1 (2) which are two pairs of storage regions of data for insertion alternately implement writing in and reading out.

When the inputted video data and the inputted audio data for insertion have been written into the V1 data storage region V1 (1) and the A1 data storage region A1 (1), the data read out from the V1 data storage region V1 (2) and from the A1 data storage region A1 (2) are respectively written into the V2 data recording region and the A2 data recording region on the hard disc after the addition of dummy data. Furthermore, the data read out from the V1 data storage region V1 (2) and from the A1 data storage region A1 (2) may be multiplexed with another signal (V1 data, A1 data) and may be outputted.

When the inputted video data and the inputted audio data for insertion have been written into the V1 data storage region V1 (2) and the A1 data storage region A1 (2), the data read out from the V1 data storage region V1 (1) and from the A1 data storage region A1 (1) are respectively written into the V2 data recording region and the A2 data recording region on the hard disc after the addition of dummy data. Furthermore, the data read out from the V1 data storage region V1 (1) and from the A1 data storage region A1 (1) may be multiplexed with another signal (V1 data, A1 data) and may be outputted.

Through the above processing it is possible to record new video data and new audio data in the V2 data recording region and in the A2 data recording region (or in the V1 data recording region and in the A1 data recording region according to selection by the user) on the hard disc drive 15. In this manner, the DV data, got by multiplexing the video data and the audio data for insertion which have been newly edited by the insert editing, the V1 data which has been recorded in the V1 data recording region on the hard disc drive 15, the A1 data which has been recorded in the A1 data recording region, can be fed out to the IEEE1394 bus 11.

According to the present invention, the V1 data, the V2 data, the A1 data and the A2 data are separated and recorded on the disc respectively and respective data are recorded from the leading address of the recording segment formed on the disc with the data length of the integer times of the recording segment. Therefore, only the necessary data may be recorded at the time of insert editing.

Furthermore, though in embodiment 4 the output signal is the DV data got by multiplexing the V1 data, the V2 data, the A1 data and the A2 data, in another embodiment not only the DV data but also the digital data in another format is outputted. For example, there are cases where only the V1 data and the A1 data are multiplexed and outputted.

Since the V1 data and the V2 data are recorded while being multiplexed as they are on the disc in a prior art, even in the case that only the V1 data and the A1 data are multiplexed and outputted, the multiplexed V1 data and V2 data as well as the multiplexed A1 data and A2 data are all read out from the hard disc, the multiplexed data is separated into the V1 data, the V2 data, the A1 data and the A2 data, and the V1 data and the A1 data among these are multiplexed and outputted.

According to the present invention, each of the V1 data, the V2 data, the A1 data and the A2 data is recorded separately on the disc and each of data is recorded from the leading address of the recording segment formed on the disc with the data length of the integer times of the recording segment. Therefore, only the V1 data and the A1 data are read out from respective data recording regions on the hard disc, and the V1 data and the A1 data are multiplexed and outputted.

Accordingly, in the present invention, all of the data need not be reproduced and only the necessary data may be reproduced.

Though in embodiment 4, DV data including an NTSC signal is recorded and reproduced, in other embodiments video signals in plural formats are recorded and reproduced.

In the era of multimedia there are cases where the recorded signals and another signals for insert editing differ in format or in encoding system. In such cases, the conventional data recording device cannot carry out editing.

In the present invention, the buffer control circuit 14 checks the format (or encoding system, or format and encoding system) of the V2 data stored in the V2 data storage region in the buffer memory and the format (or encoding system, or format and encoding system) of the video data for insertion stored in the V1 data storage region. In the same manner the format (or encoding system, or format and encoding system) of the A2 data stored in the A2 data storage region in the buffer memory and the format (or encoding system, or format and encoding system) of the audio data for insertion stored in the V1 data storage region are checked.

Video signals in different formats include for example, in addition to an NTSC signal, a PAL signal, an EDTV2 signal, an HDTV signal in Japan, a 720P signal (progressive signal with 720 horizontal scanning lines), a 1080i signal (interlace signal with 1080 horizontal scanning lines), a film video signal (video signal of 24 frames per second) or the like.

Audio signals in different formats include an audio signal of a different sampling frequency and an audio signal of which the length of frame time is different.

Video signals in different encoding systems include a video signal in the DV format, a video signal of MPEG1, a video signal of MPEG2 or the like.

Audio signals in different encoding systems include an audio signal in the DV format, an audio signal of MPEG, an audio signal of AC-3 or the like.

In the case that the V2 data and so on stored in the V2 data storage region and the video data and so on for insertion stored in the V1 data storage region are the same in format, the V1 data and the A1 data are edited by insert editing as they are (details are described above).

In the case that a video signal recorded on the disc and another video signal for insertion differ in format or in encoding system, the buffer control circuit 14 converts the format of the V1 data which is a video signal for insertion and of the A1 data which is an audio signal for insertion on the buffer memory into the same format as of the V2 data and the A2 data which have originally been recorded on the disc. After that, the converted V1 data is recorded in the V2 data recording region on the hard disc and the converted A1 data is recorded in the A2 data recording region on the hard disc.

Accordingly, in the case that the V2 data is, for example, an NTSC signal and the V1 data is an HDTV signal, there is no risk on the hard disc that the V1 data will destroy the data by invading into other data recording regions (for example, a V1 data recording region) because they cannot be contained in the V2 data recording region by insert editing. Since the V1 data is converted in format to the video signal of an NTSC signal, it does not destroy other signals or the like, and can be edited by insert editing.

Furthermore the format conversion can be carried out in accordance with the format of the data stored in the data recording region and the insert editing can be carried out because the buffer control circuit 14 judges the format or the like of each signal by reading out a video signal, which is recorded on the disc, into the buffer memory, even in the case that signals of plural formats are mixed on the disc.

Embodiment 5

In the following, the fifth embodiment which is one mode of a data recording device according to the present invention is described in reference to FIG. 24.

Figure 24:
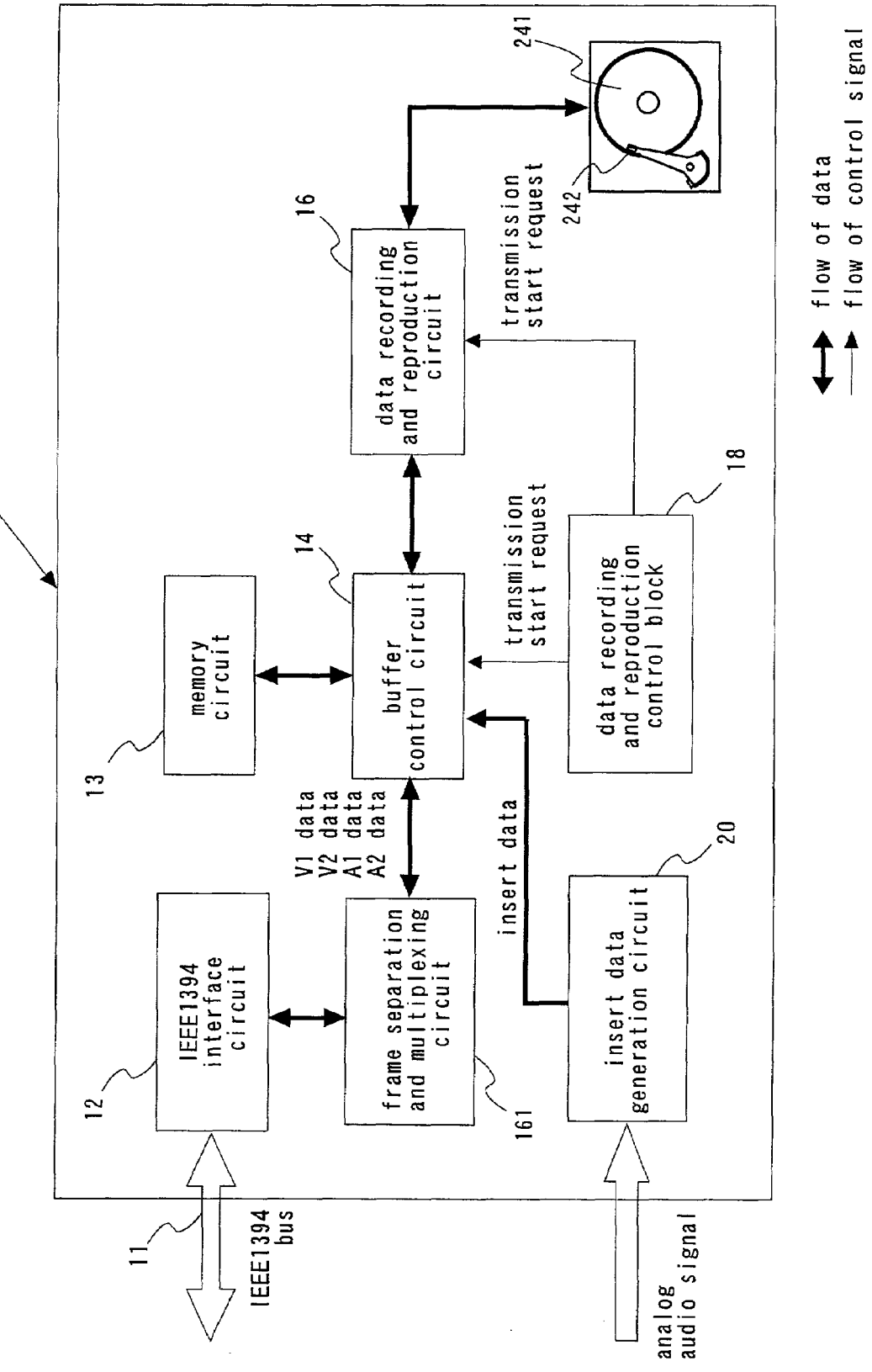
FIG. 24 is a block diagram of a data recording device in the fifth embodiment according to the present invention.

<Description of FIG. 24>

FIG. 24 is a block diagram showing the configuration of a data recording device according to the present invention.

In FIG. 24 the elements which have the same functions as in the data recording device (FIG. 16) in the fourth embodiment are denoted by the same numerals.

The data recording device of the present embodiment differs from the fourth embodiment in the point that a disc 241 which can record digital data within the data recording device and that a recording and reproduction head 242 which writes in digital data onto the disc 241 are provided.

In one embodiment, the disc 241 and the recording and reproduction head 242 form a part of the hard disc drive. While the data recording devices of embodiments 1 to 4 are data recording devices, each of which has a hard disc drive 15 unit in this data recording device, in this embodiment the hard disc drive 15 unit, itself, has a data recording and reproduction circuit in it, and the hard disc, into which this data recording and reproduction circuit is incorporated, is a data recording device of embodiment 5.

In another embodiment, the disc 241 is a disc such as a DVD (disc type which can be recorded) which can be replaced and the recording and reproduction head 242 is a head which forms part of the data recording device for carrying out recording and reproduction to and from this disc.

Though the data recording and reproduction circuit 16 in the fourth embodiment carries out recording and reproduction processing of digital data with respect to the hard disc drive 15, the data recording and reproduction circuit 16 in the present invention carries out recording and reproduction processing with respect to the disc 241 via the recording and reproduction head 242.

Since other parts of the configuration are the same as in the fourth embodiment, DV data is recorded on the disc 241 in the format as shown in FIG. 17. Furthermore, it is possible to easily record post-recording data on the disc 241 because the reproduction operation and the audio editing operation are performed in the same manner as in the fourth embodiment.

As described above, the same effect as in the fourth embodiment can be got in the present embodiment. Furthermore, in the case that each block in the present embodiment is incorporated into the electric circuit of the hard disc drive, it is possible to achieve the purpose of the present invention with a compact data recording device.

Here, though in each of above-described embodiments, the operation with respect to the DV data converted from the NTSC signal is described, in the case of a PAL signal, the audio data corresponding to the DIF sequences 0 to 5 in the above-description may be handled as A1 data while the audio data corresponding to the DIF sequences 6 to 11 may be handled as A2 data so that the same effect can be got as in the case of the NTSC signal.

Furthermore, though each of the above-described embodiments is configured so that the audio data and DV data (or the video data) are recorded in the neighboring regions for each frame (or multi-frame) on the hard disc drive, it can also be configured so that the audio data are recorded alone in a region apart from the DV data (or the video data).

Furthermore, though in a data recording device according to the present embodiment the post-recording data is recorded in the A2 data recording region, they can be recorded in the A1 region so as to get the same effect.

In a data recording device of the present invention according to Claim 1 and so on, it is easy to access, reproduce or record a particular audio signal alone on the disc at the time reproduction, at the time post-recording or the like. Thereby, the advantageous effect can be got that a particular audio signal alone can be outputted or a particular audio signal alone can be replaced.

In a data recording device of the present invention according to Claim 1 and so on, in the case that, for example, classical music alone is replaced with another audio signal on the disc where the classical music and jazz music are recorded, it becomes unnecessary to reproduce the classical music and the jazz music recorded on the disc, unlike in a conventional device. In such a case, a wasteful reproduction is unnecessary and another audio signal alone may be recorded on the disc in the present invention (In a conventional data recording device it is necessary to record a signal got by multiplexing another audio signal and the jazz music.).

Furthermore, in the present invention, the signal of the classical music alone may be reproduced in order to reproduce the classical music on the disc of the above-described example (In a conventional data recording device it is necessary to reproduce a signal got by multiplexing another audio signal and the jazz music.).

Therefore, the advantageous effect can be got according to the present invention that the data amount reproduced from the disc and the data amount recorded on the disc can be reduced. Accordingly, the advantageous effect can be got that a data processing through software by using a compact and inexpensive microprocessor becomes possible.

Furthermore, the advantageous effect can be got according to the present invention that a data recording device which uses an inexpensive disc, of which the access speed is slow, can be realized because the data amount reproduced from and recorded on the disc can be reduced.

The advantageous effect can be got by the present invention according to Claim 1 and so on, wherein a data recording device is realized of which the recording medium is a disc device or the like that makes it easy to selectively record the audio data of a particular channel by replacement (post-recording or the like) from among the audio data of plural channels which are included in the received digital data, are of short data length and are dispersed. This data recording device can get the advantageous effect that no interruptions nor skips of the video on the TV screen or of the audio occur.

In a data recording device of the present invention according to Claim 2 and so on, it becomes easy to access, reproduce or record a particular video signal alone on the disc at the time of reproduction, at the time of insert editing or the like. Thereby, the advantageous effect can be got that a particular video signal alone can be outputted or a particular video signal alone can be replaced.

In a data recording device of the present invention according to Claim 2 and so on, in the case that, for example, a video signal of a music program alone is replaced with another video signal on the disc where the video signal of the music program and a video signal of a sports program are recorded, it becomes unnecessary to reproduce the video signal of the music program and the video signal of the sports program recorded on the disc, unlike in a conventional device. In such a case, a wasteful reproduction is unnecessary according to the present invention, and another video signal alone may be recorded on the disc (In a conventional data recording device it is necessary to record a signal got by multiplexing another video signal and the video signal of the sports program).

Furthermore, according to the present invention a video signal of a music program can be outputted by reproducing the video signal of the music program alone from the disc where the video signal of the music program and a video signal of a sports program are recorded.

Therefore, the advantageous effect can be got according to the present invention that the data amount reproduced from the disc and the data amount recorded on the disc can be reduced. Accordingly, the advantageous effect can be got that a data processing through software by using a compact and inexpensive microprocessor becomes possible.

Furthermore, the advantageous effect can be got according to the present invention that a data recording device which uses an inexpensive disc, of which the access speed is slow, can be realized because the data amount reproduced from and recorded on the disc can be reduced.

The advantageous effect can be got by the present invention according to Claim 2 and so on, wherein a data recording device is realized of which the recording medium is a disc that makes it easy to selectively record a video signal of a particular channel by replacement (post-recording or the like) from among video signals of plural channels which are included in the received digital data, which are of a short data length and which are dispersed.

A data recording device of the present invention according to Claim 3 and so on, records respective video signals or respective audio signals from the leading address of the recording segment formed on the disc in accordance with the format.

Thereby, respective video signals or respective audio signals can be easily accessed with respect to the audio signals or video signals of any format and, therefore, the advantageous effect can be got that a particular audio signal or a particular video signal can always be easily accessed and that a data recording device is realized wherein the reproduction or recording by replacement of that particular audio signal or video signal is easy to perform.

The advantageous effect can be got by the present invention according to Claim 4 and so on, that in addition to the above-described effect, a signal can be recorded and reproduced through a fewer times of access to the disc.

The advantageous effect can be got by the present invention according to Claim 4 and so on, that the amount of dummy data can be reduced in total.

The advantageous effect can be got by the present invention according to Claim 5 that the amount of dummy data in total can be reduced as much as is possible and the minimum recording time, within the range wherein no problem arises in practical use, can be achieved.

The advantageous effect can be got by the present invention according to Claim 7 that a data recording device is realized which makes it easy to access respective audio signals of the two pairs of stereo audio signals included in a DV format so that a particular audio signal alone is reproduced or a particular audio signals alone is replaced, especially in a data recording device wherein digital data of the DV format is recorded.

The advantageous effect can be got by a data recording method of the present invention according to Claim 8 and so on, it can be easily performed to output a particular audio signal alone or to replace a particular audio signal alone because it becomes easy to access, reproduce or record a particular audio signal alone on the disc at the time of reproduction or at the time of recording replacement.

Furthermore, a data recording method of the present invention according to Claim 8 and so on, can reproduce a particular signal alone from among plural audio signals and can, thereby, output this audio signal (A conventional data recording device cannot output a particular audio signal unless the multiplexed plural audio signals are all reproduced). Furthermore, in the case that a signal on the disc is replaced, a wasteful reproduction of signals is unnecessary and a signal to be recorded alone may be recorded. Accordingly, the data amount to be reproduced or recorded is small and the signal amount to be processed is small so that the advantageous effect can be got that a data recording method can be realized wherein a data processing through software by using a compact and inexpensive microprocessor is possible.

Furthermore the advantageous effect can be got that a data recording method is realized which uses a disc of a slow access speed because the data amount reproduced from and recorded on the disc can be reduced.

The present invention according to Claim 8 and so on records the audio data of a particular channel, gathering this audio data together from among the audio data of plural channels which is included in the received digital data and which are of a short data length and are dispersed. Thereby, the advantageous effect can be got that a data recording method is realized of which the recording medium is a disc, and by which it is easy to selectively replace and record data (post-recording or the like). The advantageous effect can be got according to this data recording method that no interruptions nor skips of the video and the audio occur on the TV screen, into which digital data outputted from the data recording device are inputted.

A data recording method of the present invention separates plural video signals from among the received digital data and records them from the leading address of the recording segment formed on the disc for each video signal. Thereby, the advantageous effect can be got that it is easy to output a particular video signal alone or to replace a particular video signal alone because it becomes easy to access a particular video signal on the disc and to reproduce this video signal or to record a signal therein at the time of reproduction, at the time of recording by replacement or the like.

Furthermore, the advantageous effect can be got by a data recording method of the present invention that the signal amount to be processed becomes small because a small amount of data is reproduced and recorded, and thereby, that a data processing through software by using a compact and inexpensive microprocessor becomes possible.

Furthermore the advantageous effect can be got that a data recording method is realized using a disc of a slow access speed because the data amount reproduced from and recorded on the disc can be reduced.

The present invention records the video data of a particular channel, gathering this video data together from among the video data of plural channels which are included in the received digital data and which are of a short data length and which are dispersed. Thereby, the advantageous effect can be got that a data recording method is realized of which the recording medium is a disc where it is easy to selectively replace and record data (post-recording or the like). The advantageous effect can, for example, be got that, in the case that a data recording device according to this data recording method carries out ISOCHRONOUS transmission of the video data, neither interruptions nor skips of the video on the TV screen and the audio occur.

The present invention generates a multi-audio block by combining plural audio blocks. Thereby, the advantageous effect can be got that a signal can be recorded by a fewer times of access to the disc.

On the disc of a hard disc drive or the like, not only the time required for recording or reproduction but also the time required for the head to access a location where recording or reproduction is carried out is long. A specific number of audio blocks are stored in a buffer memory (multi-audio block), the multi-audio block is recorded in a lump on the disc by one access of the head instead of recording individual audio blocks on the disc at each frame and, thereby, a data recording method can be realized wherein the data processing performance of the data recording device as the whole is enhanced.

The advantageous effect can be got by the present invention that the amount of dummy data can be reduced as the whole.

The advantageous effect can be got by the present invention that a data recording device is realized which makes it easy to access respective audio signals of the two pairs of stereo audio signals included in a DV format so that a particular audio signal alone is reproduced or a particular audio signals alone is replaced, in a data recording device wherein digital data of the DV format is recorded.

The advantageous effect can be got by the present invention wherein the minimum editing time that is shorter than a constant data length which is a unit for recording on the disc, is achieved.

The present invention judges the format or the like of the originally recorded video signals, converts data to the same format for the recording on the disc, and record the converted data on the disc even in the case where video signal of different format or the like is edited by insert editing. Thereby, the advantageous effect can be got that a data recording device is realized wherein an arbitrary video signal can be edited by insert editing.

The advantageous effect can be got by the present invention that a data recording method is realized wherein insert editing or the like can be carried out with a time segment which is smaller than the video block, or the audio block that is the recording unit.

Furthermore, the advantageous effect can be got that a data recording method is realized where the video signal (or the audio signal) of a different format (or encoding system) can be edited by insert editing.

Though the invention is described in detail, to a certain degree, with respect to the preferred embodiments, the presently disclosed contents of these preferred embodiments could be varied in the details of configuration and modification of the combination or ordering of the respective elements could be implemented without deviating from the scope and the spirit of the claimed invention.

The invention claimed is:

1. A data recording, editing and reproducing method for recording, editing and reproducing video and/or audio data (DV data) in the DV format, said method comprising the steps of:
    receiving DV data through an IEEE 1394 Interface;
    temporarily storing the received DV data into a DV data storage region of a buffer memory;
    separating and reading out audio data and/or video data from the DV data stored in the DV storage region of the buffer memory and writing the read out audio data and/or video data into audio and/or video data storage regions of the buffer memory;
    recording the DV data stored in the DV storage region of the buffer memory into a DV storage region of a disc means;
    recording the audio and/or video data stored in the audio and/or video data storage regions of the buffer memory into audio and/or video storage regions of the disc means;
    transmitting post recording audio and/or video data into the post recording data storage region on the buffer memory;
    recording the post-recording audio or video data stored in the post-recording audio or video data region of the buffer memory into post-recording audio or video data regions of the disc means;
    editing the audio and/or video data stored in the audio and/or video data storage regions of the disc means by replacing the audio data and/or video data by the post-recording audio and/or video data stored in the disc means, and
    reproducing the edited audio and/or video data on the disc means by storing the edited audio data and/or video data and the DV data on the disc means into the respective data storage regions of the buffer memory, multiplexing the stored audio and/or video data with the stored DV data and sending out multiplexed audio and/or video data and DV data as DV data.

2. The method of claim 1, wherein the received DV data are organized in blocks and the storing, separating, writing in, reading out, recording and editing of data proceed blockwise by identifying data blocks in the frame unit of the received DV data and processing them blockwise.

3. The method of claim 2, wherein at least a first audio and/or video block and a second audio and/or video block are separated from the received DV data.

4. The method of claim 3, wherein plural said first audio blocks as a first multi-audio block and plural said second audio blocks as a second multi-audio-block are separated from the received DV data.

5. The method of claim 4, wherein said first multi-audio block and said second multi-audio block are formed of audio blocks for 16 frames respectively.

6. The method of one of claims 2 to 5, wherein each data block has constant data length.

7. The method of claim 6, wherein said constant data length is N frame(s), N being a positive integer including 1.

8. A data recording editing and reproducing device for recording, editing and reproducing video and/or audio data (DV data) in the DV format, said device comprising:
    an IEEE 1394 interface circuit (12) for sending and receiving DV data;
    a buffer memory (13) for temporarily storing data into a DV data storage region, an audio and/or video data storage region, and a post recording data storage region;
    a disc means (15) for recording data into a DV data storage region, an audio and/or video data storage region, and a post recording data storage region;
    an insert data generation circuit (20) for providing audio data and/or video data to be inserted into the DV data;
    a data recording and reproduction circuit (16,18) for carrying out writing in and reading out data with respect to the disc means (15); and
    a separation and multiplexing block (17,111,161) for separating audio and/or video data from DV data at the time of recording, and multiplexing audio and/or video data with respect to DV-data at the time of reproduction; wherein for recording, reproducing and editing DV data received from the interface circuit (12):
    the DV data sent by the interface circuit (12) being stored into the DV storage region of the buffer memory (13) as they are,
    the separation and multiplexing block (17,111,161) reading out audio data and/or video data from the DV data stored in the DV storage region of the buffer memory (13) and writing the audio and/or video data into the audio and/or video data storage regions of the buffer memory (13),
    the insert data generation data providing circuit (20) transmitting post recording audio and/or video data into the post recording data storage region on the buffer memory (13),
    the data recording and reproduction circuit (18) recording the DV data stored in the DV storage region of the buffer memory (13) into the DV storage region of the disc means (15), the audio and/or video data stored in the audio and/or video data storage regions of the buffer memory (13) and the post recording audio or video data stored in the post-recording audio or video data region of the buffer memory (13) into the audio and/or video storage regions and the post-recording audio or video data regions of the disc means (15); wherein for editing purposes audio and/or video data stored in the audio and/or video data storage regions of the disc means (15) are replaced by post-recording audio or video data stored in the disc means (15), and wherein the edited audio and/or video data on the disc means (15) are reproduced by storing the edited audio and/or video data and the DV data on the disc means (15) into the respective data storage regions of the buffer memory (13), by multiplexing these audio and/or video data with the DV data on the disc means by means of the separation and multiplexing block (17,111,161) and sending the multiplexed audio and/or video data and the DV data to the interface circuit (12) as DV data.

* * * * *